(12) United States Patent
Radulescu et al.

(10) Patent No.: US 11,505,046 B2
(45) Date of Patent: Nov. 22, 2022

(54) ROLLING TARP ENCLOSURE

(71) Applicant: 6866336 CANADA INC., Pointe-Claire (CA)

(72) Inventors: Adrian Radulescu, Laval (CA); Jason Chung, Dorval (CA); Andrei Radulescu, Laval (CA)

(73) Assignee: 6866336 CANADA INC., Pointe-Claire (CA)

( * ) Notice: Subject to any disclaimer, the term of this patent is extended or adjusted under 35 U.S.C. 154(b) by 127 days.

(21) Appl. No.: 17/150,416

(22) Filed: Jan. 15, 2021

(65) Prior Publication Data

US 2021/0221202 A1 Jul. 22, 2021

Related U.S. Application Data

(60) Provisional application No. 62/962,499, filed on Jan. 17, 2020.

(51) Int. Cl.
*B60J 7/06* (2006.01)

(52) U.S. Cl.
CPC .................................. *B60J 7/061* (2013.01)

(58) Field of Classification Search
CPC .... B60P 3/343; B60P 7/04; B60J 7/061; B60J 7/064; B60J 7/065; B60J 7/102
USPC ........................ 296/100.12, 100.13, 100.14
See application file for complete search history.

(56) References Cited

U.S. PATENT DOCUMENTS

| 3,361,144 A | 1/1968 | Folkes |
| 3,424,179 A | 1/1969 | Minot |
| 3,592,222 A | 7/1971 | Goss et al. |
| 3,858,358 A | 1/1975 | Stachowiak et al. |
| 3,889,104 A | 6/1975 | Smith |
| 3,986,670 A | 10/1976 | Syveson |
| 4,028,861 A | 6/1977 | Huddle |
| 4,644,706 A | 2/1987 | Stafford et al. |
| 4,649,947 A | 3/1987 | Tury et al. |
| 4,657,062 A | 4/1987 | Tuerk |
| 4,667,692 A | 5/1987 | Tury et al. |

(Continued)

FOREIGN PATENT DOCUMENTS

| AU | 2002361604 A1 | 5/2003 |
| AU | 2003237438 A8 | 6/2003 |

(Continued)

*Primary Examiner* — Joseph D. Pape
*Assistant Examiner* — Veronica M Shull
(74) *Attorney, Agent, or Firm* — Norton Rose Fulbright Canada

(57) ABSTRACT

A rail system for mounting a tarp enclosure to a platform, comprising a rail body having a channel and a bumper beneath thereof, and a carriage displaceable along the channel and attachable to the tarp enclosure so as to position the tarp enclosure over the rail body. A tubing system for the tarp enclosure, comprising a first member having four first tracks sized to slidably receive a cordon of the tarp enclosure, a second member having four second tracks sized to slidably receive the cordon, a tubing connector having four connector tracks sized to slidably receive the cordon. There is also provided a method for assembling a tubing assembly, comprising joining the first and second members to the tubing connector such that any one of the first tracks is in communication with a one of the second tracks via a one of the connector tracks.

23 Claims, 14 Drawing Sheets

(56) References Cited

U.S. PATENT DOCUMENTS

| | | |
|---|---|---|
| 4,683,686 A | 8/1987 | Ozdemir |
| 4,740,029 A | 4/1988 | Tuerk |
| 4,841,688 A | 6/1989 | Rinaldi |
| 4,844,109 A | 7/1989 | Navarro |
| 4,854,630 A | 8/1989 | Biancale |
| 4,902,064 A | 2/1990 | Tuerk et al. |
| 5,050,923 A | 9/1991 | Petelka |
| 5,080,423 A | 1/1992 | Merlot et al. |
| 5,092,648 A | 3/1992 | Spears |
| 5,152,575 A | 10/1992 | Demonte et al. |
| 5,181,352 A | 1/1993 | Friedman |
| 5,269,106 A | 12/1993 | Stafford et al. |
| 5,288,123 A | 2/1994 | Dimmer |
| 5,320,396 A | 6/1994 | Petelka |
| 5,487,584 A | 1/1996 | Jespersen |
| 5,525,026 A | 6/1996 | Demonte et al. |
| 5,546,972 A | 8/1996 | Wardell et al. |
| 5,769,704 A | 6/1998 | Henning et al. |
| 5,924,758 A | 7/1999 | Dimmer et al. |
| 5,924,759 A | 7/1999 | Demonte et al. |
| 6,062,780 A | 5/2000 | Petelka |
| 6,109,283 A | 8/2000 | Burke et al. |
| 6,139,085 A | 10/2000 | Templin et al. |
| 6,347,826 B1 | 2/2002 | Horner et al. |
| 6,419,301 B1 | 7/2002 | Tuerk |
| 6,474,718 B1 | 11/2002 | Henning |
| 6,474,719 B2 | 11/2002 | Henning |
| 6,513,856 B1 | 2/2003 | Swanson et al. |
| 6,578,897 B2 | 6/2003 | White |
| 6,582,007 B2 | 6/2003 | Gothier et al. |
| 6,695,382 B2 | 2/2004 | Ciferri et al. |
| 6,712,419 B1 | 3/2004 | Gothier |
| 6,793,273 B1 | 9/2004 | Tuerk |
| 6,886,879 B2 | 5/2005 | Nolan et al. |
| 6,945,865 B1 | 9/2005 | Turek |
| 6,976,433 B1 | 12/2005 | Neumann |
| 7,032,950 B2 | 4/2006 | Eggers et al. |
| 7,188,817 B2 | 3/2007 | Henning |
| 7,275,780 B2 | 10/2007 | Boyd et al. |
| 7,296,842 B2 | 11/2007 | Growcock et al. |
| 7,325,856 B2 | 2/2008 | Merlot et al. |
| 7,367,606 B2 | 5/2008 | Ellis |
| 7,374,225 B2 | 5/2008 | Petelka |
| 7,389,785 B2 | 6/2008 | Loudermilk et al. |
| 7,445,265 B1 | 11/2008 | Neumann et al. |
| 7,703,833 B2 | 4/2010 | Petelka |
| 7,798,553 B2 | 9/2010 | Beshiri et al. |
| 7,841,642 B2 | 11/2010 | Schaefer |
| 7,849,639 B2 | 12/2010 | Sprung |
| 7,931,326 B2 | 4/2011 | Beshiri |
| 7,971,597 B2 | 7/2011 | Reyen et al. |
| 7,993,041 B2 | 8/2011 | Petelka |
| 8,047,600 B2 | 11/2011 | Leblanc et al. |
| 8,061,759 B2 | 11/2011 | Conner |
| 8,136,306 B2 | 3/2012 | Scheps |
| 8,172,477 B2 * | 5/2012 | Damsi ................ B62D 33/0207 403/205 |
| 8,205,927 B2 | 6/2012 | Eggers |
| 8,267,461 B2 | 9/2012 | Prince et al. |
| 8,439,424 B1 * | 5/2013 | Damsi ..................... B60J 7/104 296/100.18 |
| 8,550,532 B2 | 10/2013 | Reeder et al. |
| 8,567,848 B2 | 10/2013 | Damsi |
| 8,801,077 B2 | 8/2014 | Vogel et al. |
| 8,826,827 B1 | 9/2014 | Dimmer et al. |
| 8,882,172 B2 | 11/2014 | Reeder |
| 8,888,535 B2 | 11/2014 | Knight et al. |
| 9,073,414 B2 | 7/2015 | McKibben et al. |
| 9,079,622 B2 | 7/2015 | Gan et al. |
| 9,346,343 B1 | 5/2016 | Knight et al. |
| 9,499,033 B1 * | 11/2016 | Nixon ........................ B60J 7/10 |
| 9,701,348 B2 | 7/2017 | Damsi |
| 9,744,834 B2 | 8/2017 | Damsi et al. |
| 9,812,923 B2 | 11/2017 | Searfoss |
| 9,815,506 B2 | 11/2017 | Vogel et al. |
| 10,081,234 B2 | 9/2018 | Beshiri et al. |
| 10,183,559 B2 * | 1/2019 | De ............................ B60J 7/185 |
| 10,322,870 B1 | 6/2019 | Knight et al. |
| 10,328,777 B2 | 6/2019 | Searfoss |
| 10,434,851 B2 | 10/2019 | Searfoss |
| 10,434,852 B2 | 10/2019 | Searfoss |
| 10,596,885 B1 * | 3/2020 | McWilliams ............ B60J 7/102 |
| 10,696,312 B1 | 6/2020 | Knight et al. |
| 10,864,948 B2 | 12/2020 | Reeder et al. |
| 10,864,952 B2 | 12/2020 | Miller et al. |
| 10,899,205 B1 | 1/2021 | Knight et al. |
| 10,935,069 B2 | 3/2021 | Searfoss |
| 10,946,733 B2 | 3/2021 | Demonte et al. |
| 2002/0140248 A1 | 10/2002 | White |
| 2002/0145304 A1 | 10/2002 | Henning |
| 2003/0067185 A1 | 4/2003 | Gothier et al. |
| 2005/0173940 A1 | 8/2005 | Smith et al. |
| 2006/0113820 A1 | 6/2006 | Morrow |
| 2006/0119128 A1 | 6/2006 | Boyd et al. |
| 2006/0192407 A1 | 8/2006 | Coughtry |
| 2006/0261629 A1 | 11/2006 | Lowry et al. |
| 2008/0148515 A1 | 6/2008 | Petelka |
| 2008/0217953 A1 | 9/2008 | Beshiri |
| 2008/0231069 A1 | 9/2008 | Petelka |
| 2009/0108622 A1 | 4/2009 | Damsi et al. |
| 2009/0206629 A1 | 8/2009 | Damsi |
| 2010/0038925 A1 | 2/2010 | Conner |
| 2010/0078136 A1 | 4/2010 | Beshiri et al. |
| 2010/0270825 A1 * | 10/2010 | Beshiri .................... B60J 7/102 296/100.16 |
| 2011/0030575 A1 | 2/2011 | Schaefer et al. |
| 2011/0078958 A1 | 4/2011 | Knight et al. |
| 2011/0084517 A1 | 4/2011 | Vogel et al. |
| 2011/0175390 A1 | 7/2011 | Verduyn et al. |
| 2011/0221233 A1 | 9/2011 | Damsi |
| 2011/0265684 A1 | 11/2011 | Knight et al. |
| 2012/0104788 A1 | 5/2012 | Prince |
| 2013/0009421 A1 | 1/2013 | Reeder et al. |
| 2014/0028049 A1 | 1/2014 | Vogel et al. |
| 2014/0073180 A1 | 3/2014 | Knight et al. |
| 2014/0138982 A1 | 5/2014 | Petelka |
| 2014/0145466 A1 | 5/2014 | Reeder |
| 2014/0217768 A1 | 8/2014 | Barley |
| 2014/0339850 A1 | 11/2014 | Grimes |
| 2014/0339854 A1 | 11/2014 | Tuerk et al. |
| 2014/0361012 A1 | 12/2014 | McKibben et al. |
| 2015/0246601 A1 | 9/2015 | Damsi et al. |
| 2015/0274059 A1 | 10/2015 | Damsi |
| 2015/0321597 A1 | 11/2015 | Knight et al. |
| 2015/0370135 A1 | 12/2015 | Kim et al. |
| 2016/0115705 A1 * | 4/2016 | Hornung ............. E04F 10/0637 160/78 |
| 2016/0207382 A1 | 7/2016 | Damsi et al. |
| 2016/0263978 A1 | 9/2016 | Damsi et al. |
| 2017/0001733 A1 | 1/2017 | Larson |
| 2017/0144519 A1 | 5/2017 | Searfoss |
| 2018/0111461 A1 | 4/2018 | Searfoss |
| 2018/0264987 A1 | 9/2018 | Weschke, Jr. et al. |
| 2018/0272847 A1 | 9/2018 | Beshiri et al. |
| 2018/0319258 A1 | 11/2018 | Searfoss |
| 2019/0118626 A1 | 4/2019 | DeMonte et al. |
| 2019/0176906 A1 | 6/2019 | Miller et al. |
| 2019/0193796 A1 | 6/2019 | Miller et al. |
| 2019/0217691 A1 | 7/2019 | Eggers |
| 2021/0016644 A1 | 1/2021 | Weschke, Jr. et al. |

FOREIGN PATENT DOCUMENTS

| | | | |
|---|---|---|---|
| AU | 2002300170 B2 | 2/2004 | |
| AU | 2002334946 B2 | 4/2005 | |
| AU | 2002340213 B2 | 6/2005 | |
| AU | 2009222484 | 4/2010 | |
| AU | 2010201746 | 11/2011 | |
| AU | 2017285712 A1 * | 12/2018 | ............. B60J 5/065 |
| AU | 2019213386 | 8/2019 | |
| CA | 1290786 C | 10/1991 | |
| CA | 2073714 A1 | 7/1992 | |
| CA | 2074607 A1 | 3/1993 | |
| CA | 1331635 | 8/1994 | |

(56) References Cited

FOREIGN PATENT DOCUMENTS

| | | | |
|---|---|---|---|
| CA | 2143729 A1 | 9/1996 | |
| CA | 2058001 | 3/1997 | |
| CA | 2225308 A1 | 1/1998 | |
| CA | 2226356 A1 | 2/1998 | |
| CA | 2245753 | 2/1999 | |
| CA | 2124365 C | 4/1999 | |
| CA | 2275790 A1 | 6/1999 | |
| CA | 2026344 | 12/1999 | |
| CA | 2306661 A1 | 4/2000 | |
| CA | 2159749 | 1/2001 | |
| CA | 2159749 C | 1/2001 | |
| CA | 2234534 | 1/2001 | |
| CA | 2403478 | 9/2001 | |
| CA | 2402083 A1 | 9/2002 | |
| CA | 2301416 | 2/2004 | |
| CA | 2499561 | 2/2004 | |
| CA | 2453622 | 6/2004 | |
| CA | 2402083 | 7/2005 | |
| CA | 2526379 C | 4/2007 | |
| CA | 2453622 C | 6/2007 | |
| CA | 2575047 C | 12/2007 | |
| CA | 2621815 A1 | 2/2008 | |
| CA | 2581059 A1 * | 9/2008 | ............ B60J 7/102 |
| CA | 2637814 A1 | 9/2008 | |
| CA | 2641800 A1 | 10/2008 | |
| CA | 2591012 | 11/2008 | |
| CA | 2607746 C | 1/2009 | |
| CA | 2641800 | 4/2009 | |
| CA | 2621815 | 8/2009 | |
| CA | 2636445 | 12/2009 | |
| CA | 2636445 A1 | 12/2009 | |
| CA | 2665408 | 10/2010 | |
| CA | 2842179 A1 | 6/2011 | |
| CA | 2732354 | 8/2011 | |
| CA | 2753738 A1 | 4/2012 | |
| CA | 2754505 A1 | 4/2012 | |
| CA | 2775212 A1 | 4/2012 | |
| CA | 2789819 A1 | 9/2012 | |
| CA | 2783838 | 9/2013 | |
| CA | 2812680 A1 | 10/2013 | |
| CA | 2726670 | 4/2014 | |
| CA | 2730990 C | 4/2014 | |
| CA | 2595513 | 7/2014 | |
| CA | 2744164 | 9/2014 | |
| CA | 2625980 | 12/2014 | |
| CA | 2801152 C | 5/2015 | |
| CA | 2663473 | 3/2016 | |
| CA | 2923142 A1 | 3/2016 | |
| CA | 2862413 | 5/2017 | |
| CA | 2675058 | 10/2017 | |
| CA | 2998251 | 9/2018 | |
| CA | 3037773 A1 | 10/2019 | |
| CA | 3051915 A1 | 2/2020 | |
| CA | 3023715 | 8/2020 | |
| EP | 0190071 A1 | 8/1986 | |
| EP | 1284877 A2 | 2/2003 | |
| EP | 1384613 A1 | 1/2004 | |
| EP | 1463648 A4 | 3/2005 | |
| EP | 1578640 | 9/2005 | |
| EP | 2814719 A1 | 8/2013 | |
| FR | 542659 A | 8/1922 | |
| GB | 0708782 | 6/2007 | |
| GB | 2435017 A | 8/2007 | |
| JP | 3921471 B2 | 5/2007 | |
| WO | 2003033299 A3 | 4/2003 | |
| WO | 2004011316 A3 | 2/2004 | |
| WO | 2006133202 A3 | 12/2006 | |
| WO | 2007005293 A2 | 1/2007 | |
| WO | 2007021365 A3 | 2/2007 | |
| WO | 2007047586 A3 | 4/2007 | |
| WO | 2008144911 A2 | 12/2008 | |
| WO | 20090146533 | 12/2009 | |
| WO | 2010003515 A2 | 1/2010 | |
| WO | 2013122911 | 8/2013 | |
| WO | 2019183119 | 9/2019 | |

* cited by examiner

FIG 12B  FIG 12C

ROLLING TARP ENCLOSURE

CROSS-REFERENCE TO RELATED APPLICATIONS

This application claims priority to U.S. provisional patent application 62/962,499 filed Jan. 17, 2020, the entire contents of which are incorporated by reference herein.

TECHNICAL FIELD

The application relates generally to retractable enclosures, and more particularly to retractable enclosures for vehicle flatbeds or other platforms.

BACKGROUND

Rolling tarp enclosures typically include a multi-stage, arcuate framework slidably mounted on rails and over which is supported a relatively flexible shell-like tarp. Such typical rolling tarp enclosures can be arranged with respect to various types of cargo-bearing platforms, whether stationary or disposed on a trailer among other examples, over which the framework is displaceable along the rails with the tarp so as to shield the platform and its cargo space. Typical rolling tarp enclosures are thus advantageous for covering specialised merchandise, materials and equipment stored inside their cargo space regardless of their shape and size. In contrast, manual tarping solutions require strapping a loose tarp to the platform and wrapping the tarp around the cargo, an operation that can be challenging and time consuming. Also, typical rolling tarp enclosures are incrementally displaceable so as to conveniently expose the platform as needed, either partially or in full. For instance, exposing the platform can allow full and direct access to the front of the platform and its cargo space, for example allowing to approach the cargo space from either side and from overhead. In the alternative, accessing the rear part of the enclosure and unloading items located rearward of the front part so as to clear the access thereto from the rear would be needed, as would be the case with non-collapsible, box-type enclosures typical of freight trailer. Despite the typical rolling tarp enclosures holding advantages over the rigid and seamless shell of such box-type enclosures, the former may lack some of the protective characteristics of the latter.

SUMMARY

There is disclosed a connector for a tubing system comprising: a fitting extending between opposite fitting ends and a peripheral fitting wall, a portion of the peripheral fitting wall being an outer fitting wall; and a cover extending between opposite connector ends and having a peripheral cover wall, the peripheral cover wall including an outer cover wall extending lengthwise away from a first connector end of the connector ends, the peripheral cover wall including a side cover wall adjacent to the outer cover wall, the cover removably attacheable to the fitting via the side cover wall, the outer cover wall overhanging the outer fitting wall and defining four connector tracks between the outer cover wall and the outer fitting wall upon the side cover wall being attached to the fitting, the four connector tracks extending between the connector ends and spaced laterally apart from each other.

There is disclosed a tubing system for a tarp enclosure, the tubing system comprising: a tubing member extending lengthwise between opposite tubing ends, the tubing member having four tubing tracks extending along an outer tubing side thereof, the four tubing tracks sized to slidably receive an edge of a tarp of the tarp enclosure from either of the tubing ends; a tubing connector including: a fitting extending between opposite fitting ends and a peripheral fitting wall, a portion of the peripheral fitting wall being an outer fitting wall; and a cover extending between opposite connector ends and having a peripheral cover wall, the peripheral cover wall including an outer cover wall extending lengthwise away from a first connector end of the connector ends, the peripheral cover wall including a side cover wall adjacent to the outer cover wall, the cover removably attacheable to the fitting via the side cover wall, the outer cover wall overhanging the outer fitting wall and defining four connector tracks between the outer cover wall and the outer fitting wall upon the side cover wall being attached to the fitting, the four connector tracks extending between the connector ends and spaced laterally apart from each other; one of the fitting ends being engageable with one of the tubing ends to align each one of the four connector tracks with one of the four tubing tracks.

There is disclosed a rail system for mounting a tarp enclosure to a platform, the rail system comprising: a rail body extending longitudinally along a rail axis, the rail body having a top rail wall, a bottom rail wall spaced beneath the top rail wall and an inner rail wall extending therebetween and configured to be attached along a side of the platform, a channel defined along the inner rail wall between the top and bottom rail walls, a bumper disposed beneath the channel and extending away from the inner rail wall outward of the channel; and a carriage including a roller disposed inside the channel and displaceable therealong relative to the rail body along the rail axis, a bracket disposed alongside the rail body opposite the inner rail wall and configured to be attachable to the tarp enclosure so as to position the tarp enclosure over the rail body and laterally outward of the inner rail wall, the bracket connected to the roller so as to be displaceable therewith relative to the rail body.

In an embodiment, the rail body is configured to be attached along the side of the platform to position a top planar surface of the top rail wall flush with the platform.

In an embodiment, the top rail wall has ridges projecting from the top planar surface.

In an embodiment, a height of the inner rail wall is equal or lesser than a height of the side of the platform.

In an embodiment, the roller of the carriage includes vertical wheels displaceable along the bottom rail wall, and horizontal wheels displaceable along the inner rail wall.

In an embodiment, the rail body defines a curb adjoining the bottom rail wall and the inner rail wall and further delimiting the channel, the vertical and horizontal wheels being displaceable to be clear of the curb.

In an embodiment, the horizontal wheels space the vertical wheels away from the inner rail wall so as to form a gap therebetween.

In an embodiment, a fastener configured to attach the inner rail wall to the side of the platform, the fastener being disposed in the gap and clear of the vertical wheels upon attaching the inner rail wall with the fastener.

In an embodiment, the rail system comprises a mudguard fastened to the rail body underneath the rail body, the mudguard extending laterally past the bumper underneath the channel.

In an embodiment, the rail system comprises a protector plate disposed on the bottom rail wall and engaging the roller.

There is disclosed a method for assembling a tubing assembly comprising: obtaining a first tubing member having opposite first tubing ends and extending therebetween along a first axis, the first tubing member defining four first tubing tracks extending therethrough along the first axis; obtaining a second tubing member having opposite second tubing ends and extending therebetween along a second axis, the second tubing member defining four second tubing tracks extending therethrough along the second axis; obtaining a corner member having opposite first and second corner ends, the second corner end at a corner angle to the first corner end, the corner member defining four corner tracks extending therethrough between the first and second corner ends; and joining the first and second tubing members to the corner member respectively via the first and second corner ends such that any one of the first tubing tracks is in communication with a one of the second tubing tracks via a one of the corner tracks, the second axis being oriented at the corner angle to the first axis.

DESCRIPTION OF THE DRAWINGS

Reference is now made to the accompanying figures in which:

FIGS. 12B and 12C are perspective views of a cover piece of a cover of the tubing connector of FIG. 12A;

DETAILED DESCRIPTION

Figure 1:
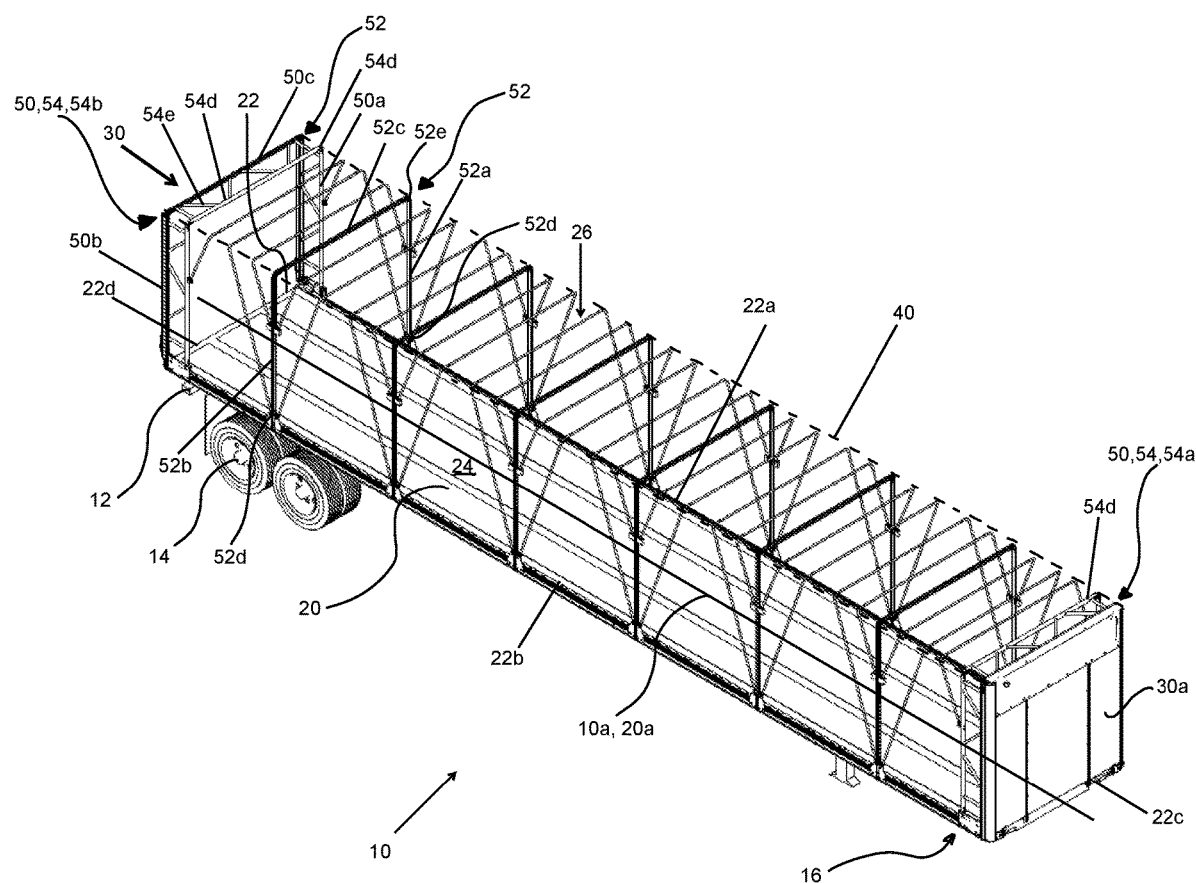
FIG. 1 is a perspective view of a trailer having a platform mounted with a tarp enclosure according to aspects of the present disclosure, a tarp of the tarp enclosure being removed.

In FIG. 1, there is shown a flatbed trailer 10 for a vehicle (not shown) of a type preferably provided for use in freight, for example a semi-trailer truck. The flatbed trailer 10 has front and rear ends spaced along a longitudinal trailer axis 10a. The trailer 10 has a chassis 12 mounted with wheel-bearing axles 14. In this embodiment, the axles 14 are rearwardly offset relative to the front end of the trailer 10, such that the front end is cantilevered. The trailer 10 has a coupling 16 disposed proximate its front end and projecting downward from the chassis 12, via which the trailer 10 is connectable to the vehicle. The flatbed trailer 10 also has a platform 20 disposed onto its chassis 12. Unless stated otherwise, in the forthcoming description, the platform 20 may otherwise be provided for other types of vehicles, for example flatbed trucks or boats, or as a standalone, stationary ground platform fixedly secured, or resting on, a ground or floor surface. The platform 20 has a periphery 22 defined by left 22a, right 22b, front 22c and rear 22d sides of the platform 20. The front and rear sides 22c, 22d are spaced from one another along a longitudinal axis 20a of the platform 20. The left and right sides 22a, 22b extend between the front and rear sides 22c, 22d along the longitudinal platform axis 20a. A top side of the platform 20 defines a floor 24 thereof. Above the floor 24, an unenclosed volume circumscribed by the periphery 22 and extending upwardly from the floor 24 may be described as a cargo space 26 of the platform 20.

A tarp enclosure 30 is shown mounted to the platform 20. The tarp enclosure 30 generally includes a tarp 40 (schematically shown) and a plurality of arch-like, tarp-supporting structures referred to as bows 50. The bows 50 are disposed side by side along the longitudinal platform axis 20a. Each bow 50 has two side portions 50a, 50b respectively disposed at the left and right sides 22a, 22b of the platform 20 and extending upwardly from the floor 24 of the platform 20 alongside the cargo space 26. Also, each bow 50 has a top portion 50c supported at its ends atop the cargo space 26 by the side portions 50a, 50b. Each bow 50 includes at least one tubular, arcuate frame 52 having two vertical segments 52a, 52b forming part of the side portions 50a, 50b and a horizontal segment 52c forming part of the top portion 50c. The vertical segments 52a, 52b each define an extremity 52d of the arcuate frame 52 and extend generally parallel to one another therefrom. The horizontal segment 52c is supported at its ends by the vertical segments 52a, 52b so as to form corners 52e of the arcuate frame 52 therewith. In this arrangement of the arcuate frame 52, the horizontal segment 52 is generally rectilinear and perpendicular to the vertical segments 52a, 52b and the corners 52e are right-angle corners, although other arrangements are possible. Each arcuate frame 52 is arranged to lay in a plane and is sized so as to overarch the platform 20 and the cargo space 26 upon its extremities 52d being positioned on either sides of the platform 20 proximate the floor 24.

At least two of the bows 50 have reinforcement elements disposed alongside their respective arcuate frames 52 and mechanically linked thereto at several locations, and may thus be described as reinforced bows 54. In this case, foremost and rearmost bows 50 are respectively front 54a and rear 54b reinforced bows 54. Although reinforcement elements have been omitted from intermediary bows 54c located between the front 54a and rear 54b reinforced bows 54, it is contemplated that any one of them may be similarly reinforced in other implementations. Reinforced bows 54 include, among their reinforcement elements, a reinforcement frame 54d spaced from their arcuate frame 52 and a reinforcement lattice structure 54e interfacing therebetween their arcuate and reinforcement frames 52, 54d. In this arrangement, the reinforcement frame 54d is of a tubular construction substantially similar to that of the arcuate frame 52. The reinforcement frames 54d are spaced inwardly from their corresponding arcuate frames 52, i.e., toward one another. Each of the reinforced bows 54 is arranged to be fitted with a panel so as to close the area circumscribed thereby upward of the platform 20. The bows 50 are arranged such that a panels of various types (e.g., a van-type hinged door panel, a tarp panel, or a fixed rigid panel) can be attached thereto so as to close or partition the tarp enclosure 30. The front reinforced bow 54a is shown fastened to the front side 22c of the platform 22, with its arcuate frame 52 joined to a front wall 30a of the tarp enclosure 30, in this case a rigid headboard. In this case, the rear bow 54b is open, i.e., has no panel attached thereto.

Figure 2:
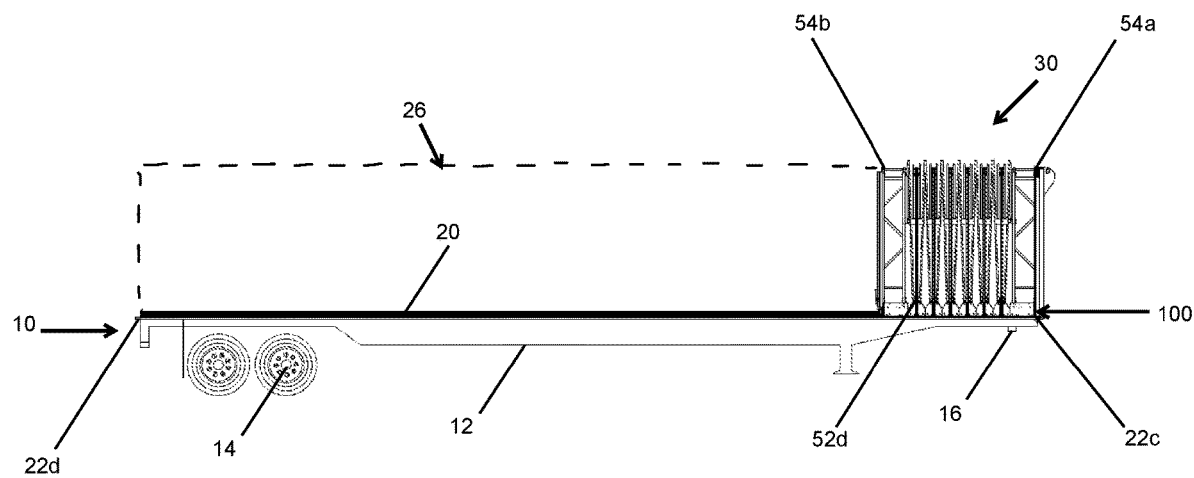
FIG. 2 is a side elevation view of the trailer of FIG. 1, with the tarp enclosure shown in a retracted position.
Figure 3:
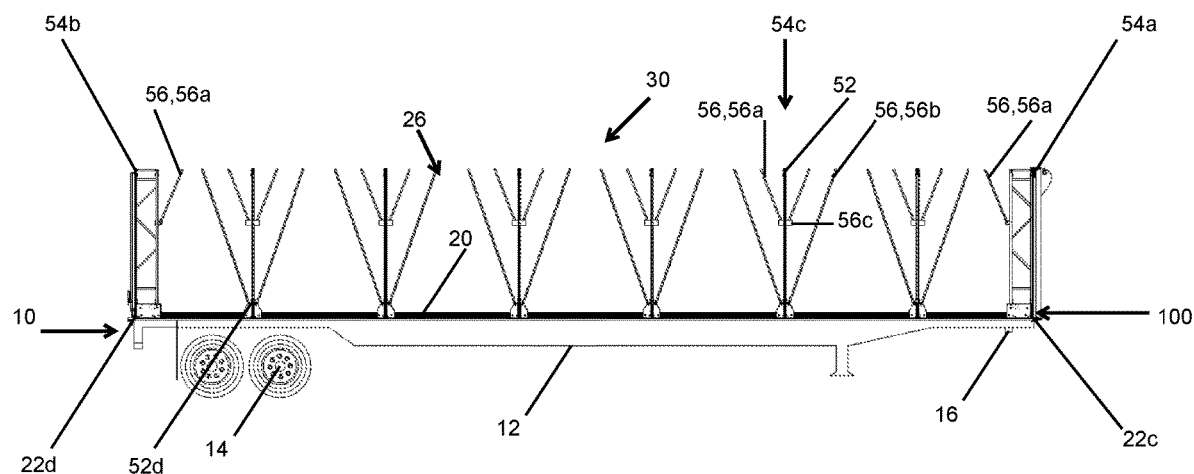
FIG. 3 is a side elevation view of the trailer of FIG. 1, with the tarp enclosure shown in a deployed position.

The tarp enclosure 30 is of a retractable type, i.e., is configured to be displaceable between retracted and deployed positions with respect to the platform 20 so as to at least partially cover the cargo space 26 underneath its tarp 40. In FIG. 2, the tarp enclosure 30 is shown in the retracted position, in which a front portion of the cargo space 26 is enclosed by the tarp enclosure 30, its remainder being exposed. In FIG. 3, the tarp enclosure 30 is positioned relative to the platform 20 in the deployed position. In this position, the entire cargo space 26 is enclosed by the tarp enclosure 30. As will be described in greater detail hereinbelow, the bows 50 are supported via the extremities 52d of their respective arcuate frame 52 by a rail system 100 mounted along the left and right sides 22a, 22b of the platform 20. Hence, the term bow may be used to refer to a given arcuate frame 52 as well as to any structural components attached thereto, for example portions of the rail system 100 attached at either extremity 52d. The rail system 100 is provided as a means for supporting and selectively positioning the tarp enclosure 30 relative to the platform 20. Indeed, the tarp enclosure 30 is displaceable between the retracted and deployed positions upon linearly displacing the bows 50 relative to one another and to the platform 20 along a trajectory defined by the rail system 100.

As best seen in FIG. 3, a total of six intermediary bows 54c are disposed between the front and rear reinforced bows 54a, 54b In other embodiments, the tarp enclosure 30 may include more or fewer intermediary bows 54c. The bows 50, in this case all of the foremost 54a, rearmost 54b and intermediary 54c bows 50, may also include arch-like lifting braces 56 having extremities pivotally joined to either side portions 50a, 50b of their arcuate frame 52. Such lifting braces 56 are movable between a folded position and an unfolded position relative to their corresponding arcuate frame 52 as the tarp enclosure 30 is displaced between the retracted and deployed positions so as to fold and extend the tarp 40. In the folded position, the lifting braces 56 extend vertically. In the unfolded position, the lifting braces 56 are oriented at an angle so as to overarch the cargo space 26 at a location between the top portion 50c of their corresponding arcuate frame 52 and a following bow 50. The reinforced bows 54a, 54b each have a sole lifting brace 56 joined to their respective reinforcement frame 54d, and may thus be described as single lift bows 50. The intermediary bows 54c have short 56a and long 56b lifting braces 56 disposed on either sides thereof, and may thus be described as double lift bows 50. The short 56a and long 56b lifting braces 56 are arranged so as to overarch the cargo space 26 at two locations increasingly spaced away from the top portion 50c of their corresponding arcuate frame 52. Under certain circumstances, double lift bows 50 may be advantageous over single lift bows 50. For instance, increasing the number of lifting braces 56 may desirably increase a load-bearing capacity of the tarp enclosure 30 in the deployed position, and desirably reduce sagging of the tarp 40 inwardly into the cargo space 26 in the retracted position. It should be noted that the arrangement of lifting braces 56 shown in the Figures is merely exemplary, and that other arrangements of lifting braces 56 are possible.

Figure 4:
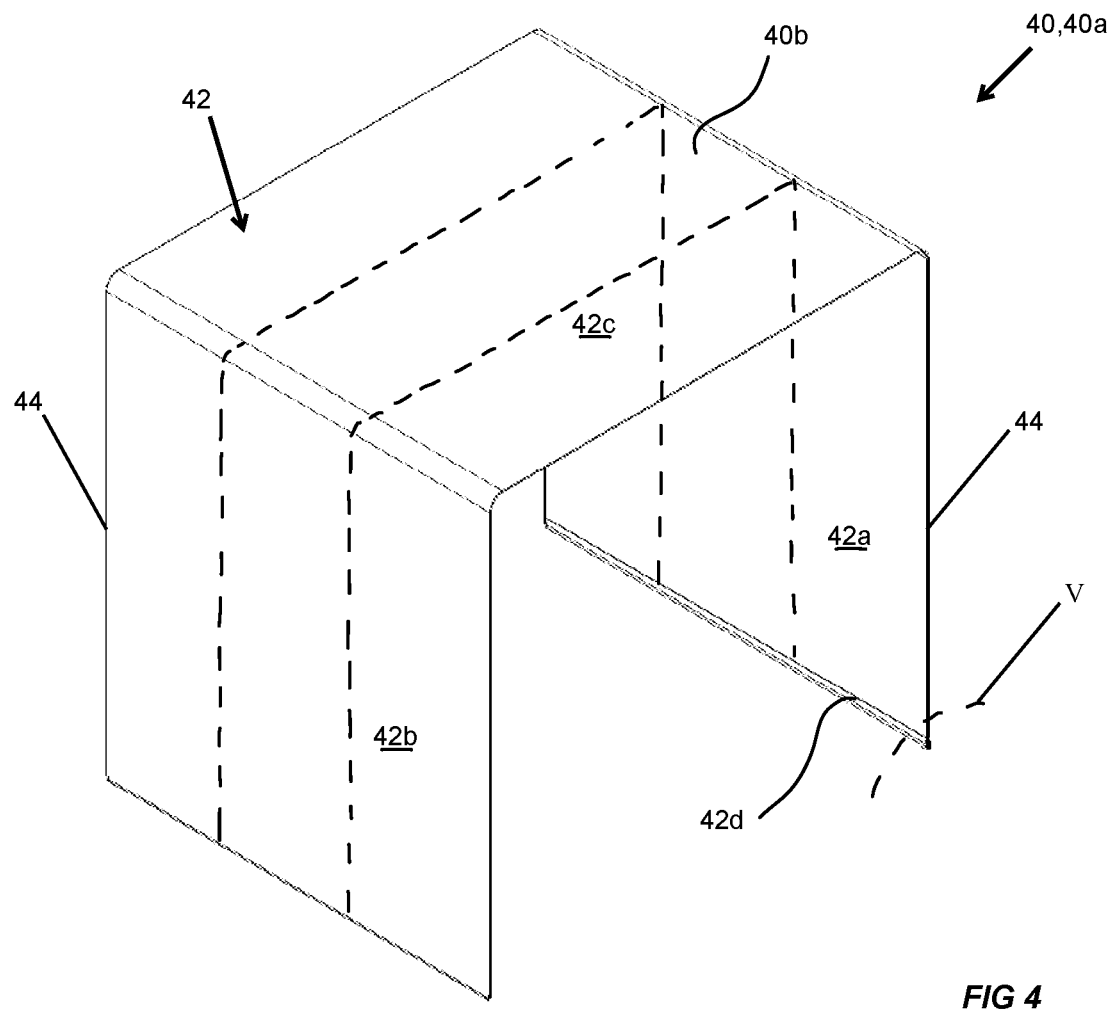
FIG. 4 is a perspective view of the tarp of the tarp enclosure of FIG. 1.

FIG. 4 shows part of the tarp 40 separately from a remainder of the tarp enclosure 30. The tarp 40 generally includes a panel 42 and cordons 44 adjoined to the panel 42. The panel 42 is a thin sheet-like structure constructed of a resiliently flexible yet strong material. A structure of the panel 42 includes one or more additional layers and/or coating(s) of material(s) imparting one or more of high radiation opacity (e.g., radiation in the visible and uv spectrums), low permeability (i.e., high impermeability), and low thermal conductivity (i.e., high insulation) to the tarp 40. In this case, the structure of the panel 42 is multi-layered, and includes a polymer-based, weaved layer of material imparting high shear and high tensile resistance to the tarp 40. The tarp 40 is deformable so as to espouse an outer shape of the bows 50. In this case, the panel 42 defines left 42a, right 42b and top 42c panel portions respectively espousing the left, right and top sides 50a, 50b, 50c of the bows 50. The tarp 40 may thus be described as an outer tarp 40a, i.e., a tarp 40 espousing an outer shape of the cargo space 26. The left, right and top panel portions 42a, 42b, 42c seamlessly adjoin one another, although in other embodiments, the panel 42 could otherwise be made of distinct panel portions joined to one another via one or more means such as welding, stitching, riveting or the like. The panel 42 has a width generally corresponding to at least a span of the arcuate frames 52, i.e., a distance along an arcuate frame 52 from one of its extremities 52d to the other. The width of the panel 42 may be described as sufficient to be wrapped around the cargo space 26 from either one of the left 22a or the right 22b side of the platform 20 to the other. Also, the panel 42 has a length generally corresponding to at least that of either one of the left 22a or the right 22b side of the platform 20, i.e., corresponding to a distance between the front 22c and rear 22d sides of the platform 20. The length of the panel 42 may be described as sufficient to be deployed across the cargo space 26 from either one of the front 22c or the rear 22d side of the platform 20 to the other. Hence, the panel 42 is sized for shielding the cargo space 26 across its entire width and length. For instance, front and rear outer edges of the panel 42, oriented widthwise, may be disposed along the foremost and rearmost bows 54a, 54b such that the panel 42 overlies the intermediary bows 54c in between. As the tarp enclosure 30 is displaced away from the retracted position and toward the deployed position, lateral outer edges of the panel 42, oriented lengthwise, are tensionable between the foremost and rearmost bows 54a, 54b so as to deploy the tarp 40 across the platform 20 along its sides 22a, 22b. In some embodiments, the tarp enclosure 30 may also include one or more utility tarps 40b, i.e., tarps 40 of different sizes and shapes provided for certain use cases. For instance, some such utility tarps 40b are sized so as to wrap around the cargo space 26 widthwise and to span a portion of the cargo space 26 lengthwise, e.g., a distance between two intermediary bows 54c upon the tarp enclosure 30 being in the deployed position. In FIG. 4, one such utility tarp 40b is schematically shown underneath the outer tarp 40a. Also, other such utility tarps 40b are shaped so as to span an area generally corresponding to that surrounded by a bow 50, and may thus be used as either partitions or end walls of the cargo space 26.

Figure 5:
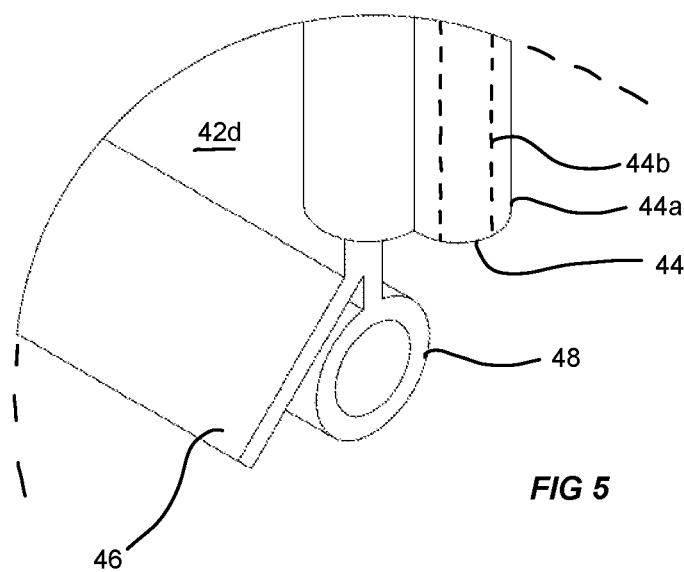
FIG. 5 is a close up view of a portion of the tarp of FIG. 4.

As best seen in FIG. 5, the cordons 44 are elongated, resiliently deformable rib-like elements of the tarp 40 provided for joining the tarp 40 to the bows 50. Cordons 44 have a thickness greater than that of the panel 42, and are disposed widthwise and spaced lengthwise along the panel 42 so as to be joinable to two of the bows 50 spaced from one another, for example to the foremost and rearmost bows 54a, 54b provided that the tarp 40 is an outer tarp 40a, and thus has a size adequate to span the entire length of the cargo space 26. Other arrangements of the tarp 40 can be provided with one or more intermediary cordons 44 (not shown) via which the tarp 40 can be joined to one or more intermediary bows 54c. Moreover, utility tarps 40b can be provided with a sole cordon 44, for example at either the front or rear edge of its panel, and with another attachment means such as a strap, a clip, a hook or the like via which it can be non-permanently joined to a bow 50 of the tarp enclosure 30 or to the platform 20. In this arrangement of the tarp 40, the cordons 44 include an elongated, hollow casing 44a fitted with an elongated insert 44b. The insert 44b is a polyethylene or rubber rod fitted inside the casing 44a. Other constructions of the cordon 44 are possible. For instance, the casing 44a may be embedded between layers of the panel 42, or be a hem formed in the panel 42. The insert 44b may be permanently joined to the casing 44a. In arrangements of the cordon 44, the insert 44b is removable from the casing 44a so as to adjust functional characteristics of the cordon 44, i.e., characteristics of the cordon 44 having an incidence on how the tarp 40 interfaces the bows 50 in use, as will be described in greater detail below. For example, at least one of a rigidity, a resistance to axial loads (i.e., to buckling deformation) and a resistance to transverse loads (i.e., to pinching deformation) of the cordon 44 is greater upon the insert 44b being received by the casing 44a than absent the insert 44b. Further, a plurality of different interchangeable inserts 44b can be configured so as to selectively provide the cordon 44 with different functional characteristics. For example, such interchangeable inserts 44b may be sized relative to the casing 44a so as to achieve different fits therewith, or be constructed of materials having different mechanical properties. In yet other possible constructions, the cordon 44 may be a formation integral to the panel 42, for example a portion of the panel 42 rolled up onto itself and bonded in this position.

Still referring to FIG. 5, the tarp 40 further includes a number of elements provided for interfacing with the platform 20. Such elements of the tarp 40 include reinforcement strips 42d superimposed on the inside of the panel 42 along its lateral edges. The reinforcement strips 42d can be sized with a length and a height generally corresponding to or exceeding those of the left 22a and right 22b sides of the platform 20, for example when provided for the outer tarp 40a. The reinforcement strips 42d are arranged for protecting the panel 42 from wear that may for example occur upon the panel 42 making contact with elements of the rail system 100, the platform 20 or with contents of the cargo space 26. In some arrangements, the reinforcement strips 42d are constructed of one or more of the materials of which the panel 42 is constructed of. In this exemplary arrangement, the reinforcement strips 42d have a construction corresponding to that of the panel 42.

The tarp 40 also includes skirts 46 projecting from the panel 42 along its left and right outer edges. The skirts 46 may be arranged so as to extend away from the panel 42 at an inward angle thereto (i.e., toward the platform 20). The skirts 46 are sized so as to at least partially closw a gap that may appear between the tarp 40 and the platform 20, and via which air, water and/or debris may otherwise enter the cargo space 26. In this exemplary arrangement, the reinforcement strips 42d and the skirts 46 form an integral piece. The skirts 46 are portions of the reinforcement strips 42d extending past the panel 42 and shaped so as to be at the inward angle thereto.

Referring to FIG. 5, the tarp 40 includes sleeves 48 disposed lengthwise along the left and right outer edges of the panel 42. Each sleeve 48 is arranged to receive a polytube containing a cable, a rope, or the like that may be used to hold the sleeve 48 in position relative to the platform 20 or to another element of the tarp enclosure 30. For example, the sleeve 48 can be stringed to the sleeve 48 of another tarp 40 (e.g., a utility tarp 40b serving as an end wall). The sleeves 48 can also be stringed to the bows 50 (or to elements of the rail system 100 connected thereto) so as to secure the tarp 40 thereto. Under certain circumstances, the sleeves 48 may thus assist in holding positions of the cordons 44 relative to the bows 50 and of the skirts 46 relative to the platform 20. In some arrangements of the tarp 40, at least one of the reinforcement strips 42d, the skirts 46 and the sleeves 48 is omitted.

Figure 6:
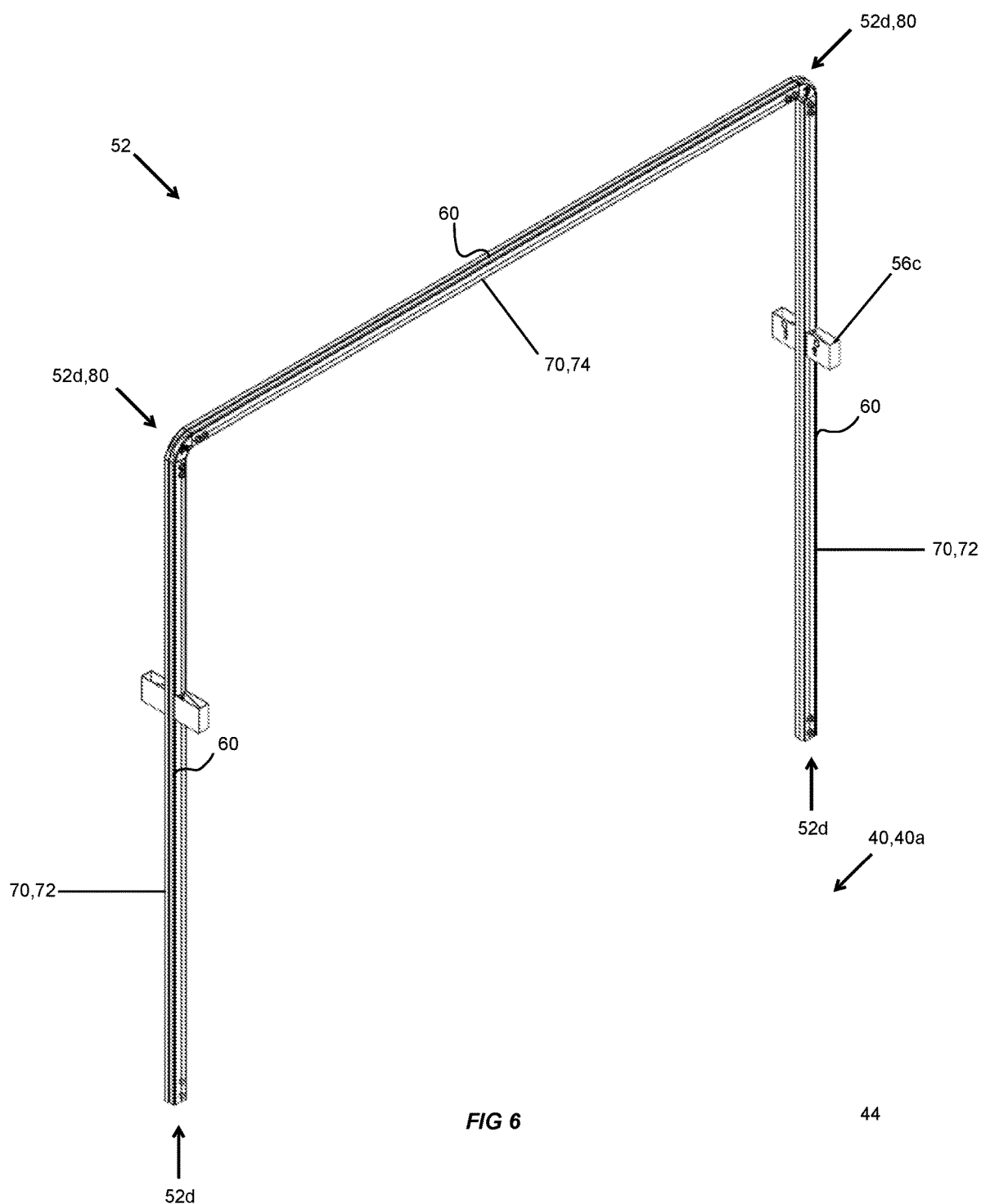
FIG. 6 is a perspective view of an arcuate frame of the tarp enclosure of FIG. 1.

Turning now to FIG. 6, assembly characteristics of the tarp enclosure 30 will be described, at first with respect to one of the arcuate frames 52 shown separate from a remainder of the tarp enclosure 30. The description of the arcuate frame 52 shown in FIG. 6 applies, mutatis mutandis, to all of the arcuate frames 52 of the tarp enclosure 30. The arcuate frame 52 has brackets 56c to which one of the lifting braces 56 is pivotally connected. In this arrangement of the tarp enclosure 30, the short lifting braces 56a and the long lifting braces 56b are respectively joined to the arcuate frame 52 via the brackets 56c and via bow-mounting elements of the rail system 100. Four brackets 56c respectively project from front and rear sides of each one of the vertical segments 52a, 52b, such that a pair of brackets 56c is disposed on each of the front and rear sides of the arcuate frame 52. It will be understood that this arrangement of brackets 56c and lifting braces 56 generally corresponds to that provided for arcuate frames 52 of intermediary bows 54c. Indeed, the foremost and rearmost bows 54a, 54b instead have lifting braces 56 on only one of their front and rear sides.

Furthermore, the arcuate frame 52 has a plurality of tarp-receiving features via any one of which the tarp 40 is joinable thereto, provided in the form of a plurality of tracks 60. Indeed, the arcuate frame 52 is joinable to the tarp 40 via any one of its tracks 60, which may be selected on the basis of a desired tarp configuration for the tarp enclosure 30. The tracks 60 are disposed next to one another and extend between the extremities 52d of the arcuate frame 52. Depending on the implementation, a given track 60 may extend across the entire length of the arcuate frame 52 from one of the extremities 52d to the other, allowing a sole, suitably sized tarp 40 to be used therewith. On the other hand, some tracks 60 may instead be segmented along their lengths, for example where portions of arcuate frames 52 connect end to end, namely tubing members 70 and tubing connectors 80, as will be described in more detail hereinbelow. In FIG. 6, three tubing members 70 (i.e., two vertical tubing members 72 and one horizontal tubing member 74) are shown interconnected by two tubing connectors 80. In one possible tarp configuration, multiple tarps 40 can be joined to the arcuate frame 52 next to one another via the plurality of tracks 60. The cordons 44 are receivable by the tracks 60 so as to form non-permanent joints between their corresponding tarp 40 and the arcuate frame 52. The reinforcement frames 54*d* of the foremost and rearmost bows 54*a*, 54*b* may have arrangements of tracks 60 generally corresponding to the plurality of tracks 60 of the arcuate frame 52 so as to be joinable to the tarp 40. Thus, upon the foremost and rearmost bows 54*a*, 54*b* being joined to the tarp 40 at foremost and rearmost edges thereof, displacing either one of the foremost and rearmost bows 54*a*, 54*b* away from the other via the rail system 100 tensions the tarp 40 therebetween, displacing the tarp enclosure 30 away from the retracted position and toward the deployed position.

Figure 7:
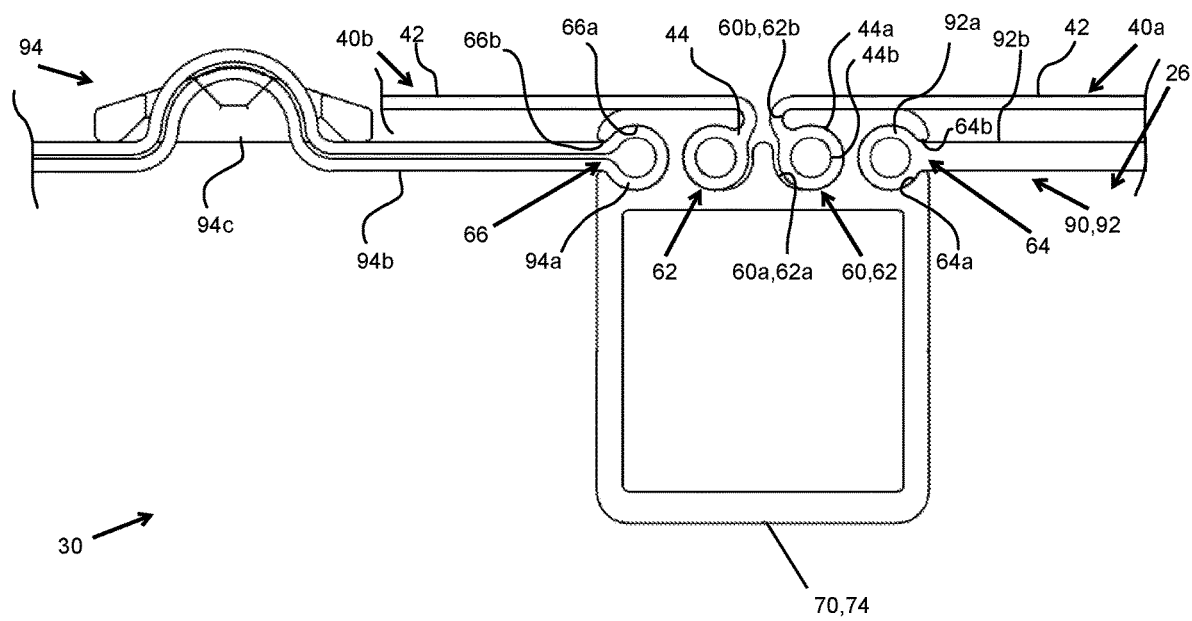
FIG. 7 is a schematic section view of a portion of the tarp enclosure of FIG. 1, wherein the tarp of FIG. 4, a utility tarp and a strap of the tarp enclosure are attached to the arcuate frame of FIG. 6.

With reference to FIG. 7, there is shown a cross section of a portion of the tarp enclosure 30, taken transversely relative to the arcuate frame 52 of the rearmost bow 54*b*. The arcuate frame 52 is partially represented, its horizontal tubing member 74 shown above the cargo space 26. For clarity, other elements of the rearmost bow 54*b* such as the vertical tubing members 72, the reinforcement frame 54*d* and the lattice structure 54*e* have been omitted. Different sides of the arcuate frame 52 respectively have one or more of the plurality of tracks 60. In the arrangement of tracks 60 in FIG. 7, the arcuate frame 52 has two outer tracks 62 along its outer side (i.e., its side facing away from the cargo space 26), a front side track 64 along its front side and a rear side track 66 along its rear side. The arcuate frames 52 of the intermediary bows 54*c* may all have front and rear side tracks 64, 66, whereas the arcuate frames 52 and the reinforcement frames 54*d* of reinforced bows 54 may be provided with only one of the side tracks 64, 66, for example along their side oriented toward a remainder of the bows 50. In an alternate embodiment, the tracks 60 may be omitted from any one side of either arcuate frame 52 of the tarp enclosure 30. As best seen in FIG. 7, the cordons 44 and the tracks 60 are provided with complementary shapes arranged for forming sliding joints between the tarp 40 and the arcuate frame 52. A cordon 44 is insertable into a given track 60 so as to be slidable therealong with the panel 42 of the tarp 40. Installation or removal of the tarp 40 can thus be performed by forcibly displacing the panel 42 along the given track 60 with the given cordon 44 received therein. Further, the tarp 40 is retained in the arcuate frame 52 because of the cordon 44 received in the given track 60 such that displacement of the panel 42 away from the arcuate frame 52 in a direction transverse to the given track 60 is hindered. Thus, the tarp 40 is tensionable between the arcuate frame 52 and that of another bow 50 of the tarp enclosure 30 upon being retained thereby via two of its cordons 44 spaced away from one another.

Different arrangements of the cordons 44, for example those described above, may be provided so as to form sliding joints having different properties, for example different degrees of resistance to sliding along the tracks 60. By removing the inserts 44*b* from inside the casings 44*a*, for example, a fit between the cordons 44 and the tracks 60 may be made looser, and the resistance to sliding due to friction may be lowered. Thus, under certain circumstances, for example during installation or removal of the tarp 40, it may be desirable to slide the casing 44*a* into the track 60 without the insert 44*b*. Sliding the insert 44*b* into the casing 44*a* once the casing 44*a* is received by the track 60 may tighten the fit in the track 60 and hinder the sliding of the cordon 44 relative to the track 60, thus assisting in securing the tarp 40 in place relative to the arcuate frame 52. Therefore, the cordons 44 may be described as means for selectively securing the tarp 40 to the arcuate frame 52. In some arrangements, the cordons 44 are fitted relative to the tracks 60 such that the sliding joint formed thereby provides an impermeable seal between the tarp 40 and the arcuate frame 52.

The tracks 60 each have a channel 60*a* formed inwardly of a periphery or peripheral surface of the bow 50, and a slot 60*b* in communication between outside the periphery and inside the channel 60*a*. The channel 60*a* has a cross-sectional shape complementary to that of the cordon 44, and sized so as to be wider than a thickness of the panel 42. The slot 60*b* has a cross-sectional shape sized so as to be wider than the thickness of the panel 42 and yet narrower than the channel 60*a*. The material surrounding the slot 60*b* and separating the channel 60*a* from the periphery of the arcuate frame 52 defines a retentive profile of the arcuate frame 52 that hinders passage of the cordon 44 and allows passage of the panel 42 therethrough. Thus, the tracks 60 may be said to be shaped so as to longitudinally guide and transversely retain the cordon 44 relative to the arcuate frame 52. In the depicted arrangement, the front and rear side tracks 64, 66 respectively have front and rear side channels 64*a*, 66*a* and rear side slots 64*b*, 66*b*. Each of the outer tracks 62 has an outer channel 62*a* and an outer slot 62*b*. The outer slots 62*b* are contiguous, and may both be described as an elongated single outer slot 62*b*. In other arrangements, the outer slots 62*b* are spaced from one another, and form separate passages for communicating with the outer channels 62*a* of their corresponding outer track 62.

Still referring to FIG. 7, configurations of the tarp enclosure 30 for shielding the cargo space 26 will now be described with respect to the arcuate frame 52 of the rearmost bow 54*b*. The arcuate frame 52 may be configured so as to retain one or more elements of the tarp enclosure 30 in various positions relative to the platform 20 and the cargo space 26, for example tarps 40 and accessories such as straps 90. The straps 90 include bracing straps 92 slidingly joined to the arcuate frame 52 and another element of the tarp enclosure 30 so as to limit displacement therebetween as the tarp enclosure 30 is displaced toward the deployed position. In this configuration, the bracing strap 92 is tensioned horizontally above the cargo space 26 between the horizontal tubing member 74 of the arcuate frame 52 and the lifting brace 56 connected thereto (not shown), a retainable end 92*a* of the bracing strap 92 retained by the front side track 64. The retainable end 92*a* has a structure akin to that of the cordon 44 in that it is slidably receivable by the channel 60*a* of any track 60. The bracing strap 92 also has an elongated band 92*b* adjoining the retainable end 92*a*. The band 92*b* is constructed of one or more weaved polymeric materials such as polyester, nylon, or the like, and is sized such that its passage through the slot 60*b* of any track 60 is allowed. In other arrangements, the band 92*b* may have a structure akin to that of the panel 42. In this exemplary arrangement of the bracing strap 92, the band 92*b* is thicker than the panel 42. In other arrangements, the bracing strap 92 has a plurality of retainable ends 92*a* spaced from one another along the band 92*b* sized with a length sufficient for the bracing strap 92 to be joinable to the arcuate frames 52 of a plurality of bows 50 of the tarp enclosure 30. The bracing strap 92b can thus be structured and arranged so as to bear a tensile load induced between bows 50 joined thereto upon the tarp enclosure 30 being in the deployed position. The bracing straps 92 are not limited to the configuration shown. Other inserts provided in the same track 62 as the bracing strap 92 may include, but are not limited to, a door, utility tarp, wear protector, theft-prevention panel, another layer of the main tarp 40, sound or heat insulation, fabric hinge for front or rear closures, and separation walls.

The straps 90 also include a securing strap 94 that is slidingly joinable to the arcuate frame 52 via any one of its tracks 60, in this configuration being the rear side track 66. The securing strap 94 has a retainable end 94a, a band 94b adjoined thereto and a tensioning buckle 94c holding overlapping strands of the band 94b. The securing strap 94 can be used for various purposes, for example to secure cargo to the arcuate frame 52, or to secure the arcuate frame 52 relative to the platform 20 or to the rail system 100. In an alternate embodiment, the strap 94 is used as a lift bow strap 94.

The outer tarp 40a and the utility tarp 40b are joined to the arcuate frame 52 via its front and rear outer tracks 62 corresponds to one of several configurations of tarps 40 rendered possible by the configuration of four tracks 60 in the tubing members 70 and corners 80. In this configuration, the utility tarp 40b is a tarp panel sized so as to span an area corresponding to that circumscribed by the platform 20 and the arcuate frame 52. The utility tarp 40b is joined to the horizontal tubing member 74 via one of its cordons 44 adjoining one of the edges of its panel 42 received by the rear outer track 62. A remainder of the utility tarp 40b can be either positioned in an open position, i.e., rolled up and fastened alongside the horizontal tubing member 74 so as to be clear of the cargo space 26 or in a closed position, i.e., unrolled between the horizontal tubing member 74 and the platform 20 so as to close the cargo space 26. The utility tarp 40b may be described as a rear door of the tarp enclosure 30, although it could instead be joined to the arcuate frame 52 of one of the intermediary bows 54c so as to partition the cargo space 26. The utility tarp 40b could also be joined to the arcuate frame 52 via the rear side track 66. With respect to the outer tarp 40a, it is sized so as to span an area corresponding to both lateral sides and a top of the cargo space 26, so as to completely enclose the cargo space 26. The outer tarp 40a is joined to the arcuate frame 52 via a rearmost one of its cordons 44 received by the front outer track 62 of the rearmost arcuate frame 52. The outer tarp 40a thus extends from the rearmost bow 54b to the foremost bow 54a, where a foremost one of its cordons 44 is received by the rear outer track 62 of the foremost arcuate frame 52. Thus, in an embodiment, the tarps 40 secured in the outer tracks 62 of the four tracks 60 are both outer tarps 40a, or "main" tarps 40.

From the above description, it can be appreciated that the arcuate frame 52 is arranged such that any vacant one of the four tracks 60 can remain unobstructed and accessible irrespective of which one of the other four tracks 60 is occupied by tarps 40 or straps 90. For instance, access to both the front and rear side tracks 64, 66 is maintained even when the outer and utility tarps 40a, 40b are joined to the arcuate frame 52 via its outer tracks 62. Conversely, access to the outer tracks 62 is maintained even when the bracing and securing straps 92, 94 are joined to the arcuate frame 52 via its front and rear side tracks 64, 66. Hence, the four tracks 60 configuration disclosed herein allows two tarps 40 for example be joined to two arcuate frames 52 so as to be deployed therebetween in an overlaid configuration, while also allowing the joining of additional tarps 40 or straps 90 to arcuate frames 52 on either side thereof. For example, a first utility tarp 40b can be joined to any two arcuate frames 52 via their respective front and rear outer tracks 62. A second utility tarp 40b can be joined to the two same arcuate frames 52 via their respective front and rear side tracks 64, 66 so as to underlay the first utility tarp 40b. Moreover, as described with respect to the outer tarp 40a, tarps 40 can be joined to two non-consecutive arcuate frames 52 so as to extend over intermediary bows 54c, and thus can overlap one or more utility tarps 40b joined to the arcuate frames 52 of such intermediary bows 54c. In some such overlapped configurations, one or more utility tarps 40b are disposed in a staggered configuration so as to overlap one another. Thus, the four tracks 60 configuration of the tarp enclosure 30 can be configured in several ways to shield, partition and/or secure the cargo space 26. Under certain circumstances, some configurations of the tarp enclosure 30 may desirably assist in safeguarding the cargo space 26 and its contents from one or more of temperature variations, radiation such as sunlight, precipitations, road spray, forceful impacts, vandalism and theft. The four-tracked frames 52 therefore allow for many different configurations of tarps 40.

Figure 8:
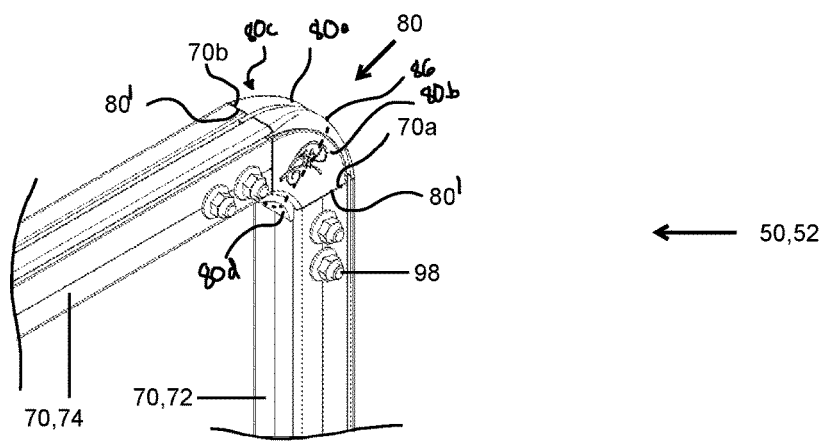
FIG. 8 is a perspective view of a corner portion of the arcuate frame of FIG. 6.
Figure 9:
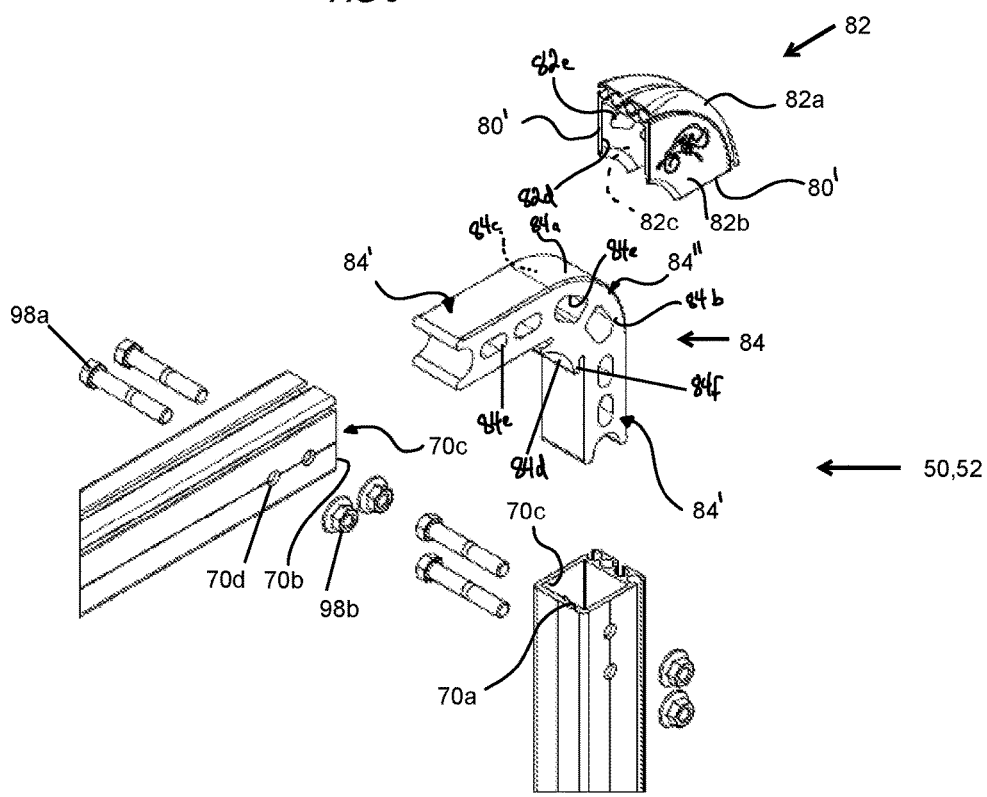
FIG. 9 is a perspective, exploded view of a tubing connector and tubing members of the corner portion of FIG. 8.

Turning now to FIG. 8, the bows 50 may be said to have a modular structure, characteristics of which will now be described. Each arcuate frame 52 includes a plurality of tubing members 70 joined to one another via the tubing connectors 80 and complementing one another so as to form the tracks 60. Indeed, each one of the tracks 60 is formed by track segments respectively extending across each one of the tubing member 72, 74 end to end. In the depicted implementation, each track 60 also includes track segments respectively extending across each one of the tubing connectors 80 in communication with corresponding track segments of adjacent tubing members 70. The tubing members 70 are elongated structures having opposite ends 70a, 70b and extending lengthwise therebetween. The tubing members 70 can be provided in various lengths. In other arrangements of the arcuate frame 52, any one of the vertical and horizontal tubing members 72, 74 may be formed by a plurality of tubing members 70 connected to one another end to end. The tubing members 70 are constructed of a rigid and impermeable material, in this case an aluminum alloy, and are manufactured by extrusion, among other possible manufacturing methods. For instance, the manufacturing process of the tubing members 70 can involve hardening treatments and finishing steps, such as milling, cutting and deburring. As best seen in FIG. 9, the tubing members 70 have a hollow interior cavity 70c.

Each tubing connector 80 has ends 80' at which tubing members 70 can be removably attached to be held in position. The ends 80' are disposed at a corner angle relative to one another, in this case a 90-degree angle. In other implementations of the tubing connector 80, the ends 80' may be axially opposite to one another or even be at a corner angle other than 90 and 180 degrees. Between the ends 80', a periphery 86 of the tubing connector 80 includes an outer periphery side 80a (i.e., a side configured for facing away from the cargo space 26), an inner periphery side 80d (i.e., a side configured for facing toward the cargo space 26) opposite the outer periphery side 80a, and lateral periphery sides 80b, 80c disposed therebetween and facing away from one another. Moreover, some alternate implementations of the tubing connector 80 may be provided with more than two ends 80', for example three to allow interconnecting another structure of the tarp enclosure 30 in addition to the two tubing members 70. Fasteners 98, for example bolts 98*a* and nuts 98*b* among other possible attachment means, are used to secure the attachment of the tubing members 70 relative to the tubing connector 80. The tubing connector 80 includes a cover 82 representing an exterior portion of the tubing connector 80 having the ends 80'. The cover 82 has a periphery, or peripheral cover wall, comprising an outer cover wall 82*a* and side cover walls 82*b*, 82*c* extending between the ends 80', together defining a partially enclosed interior cavity 82*d* of the cover 82. The cover 82 is constructed of a polymeric material, in this case polycarbonate, and may be manufactured by injection molding, among other possible materials and manufacturing methods. For instance, the cover 82 may be constructed of a metallic or a composite material, and be manufactured by casting or by additive manufacturing techniques such as 3D printing. An interior portion of the tubing connector 80, namely, a fitting 84, is provided as a means for supporting the cover 82 and for attaching the ends 80' of the tubing connector 80 to the tubing members 70. The fitting 84 is constructed of a rigid material, in this case an aluminum alloy, and is manufactured by a process including extruding, cutting and milling steps, among other possible materials and manufacturing methods. The manufacturing process of the fitting 84 can involve finishing steps, such as milling, cutting and deburring. The fitting 84 has two plugs 84' and an elbow 84" positioned between the plugs 84'. The fitting 84 has a periphery, or peripheral fitting wall, comprising an outer fitting wall 84*a*, one or more side fitting walls 84*b*, 84*c* and an inner fitting wall 84*d* of the fitting 84, extending along or between the plugs 84'. The outer and inner fitting walls 84*a*, 84*d* face away from one another, with the side fitting walls 84*b*, 84*c* extending transversely thereto on either side. The elbow 84" is sized and arranged to be receivable into the interior cavity 82*d* of the cover 82 such that the outer cover wall 82*a* overhangs the outer fitting wall 84*a*. When the cover 82 is mounted to the elbow 84", the plugs 84' extend away from the interior cavity 82*d* past the ends 80'. Moreover, the cover 82 and the fitting 84 are arranged to be attachable to one another in this position, in this case via two pairs of complementary formations, i.e., two wedge-shaped protrusions 82*e* and two recesses 84*e*. The cover 82 may be resiliently deformable such that the protrusions 82*e* latch into their corresponding recesses 84*e* after being pried apart as the cover 82 is slid onto the fitting 84. In implementations, the recesses 84*e* may be deeper than the protrusions 82*e*, and in certain cases communicate with one another, i.e., represent opposite sides of a sole opening extending through the fitting 84. The plugs 84' are arranged to fit inside the interior cavity 70*c* of each of the two tubing members 70 inwardly from their respective ends 70*a*, 70*b* upon the ends 70*a*, 70*b* interfacing the ends 80' of the tubing connector 80. The tubing members 70 and the plugs 84' define openings 70*d*, 84*e* arranged to align so as to be traversable by the fasteners 98 upon the plugs 84' being received by the interior cavities 70*c* of the tubing members 70. In other arrangements of the tubing member 70, interior cavities 70*c* are provided at either ends end 70*a*, 70*b*, respectively having a depth corresponding to a length of the plugs 84'. The interior cavity 70*c* and the plugs 84' provide means for hindering rotation of the tubing member 70 and the tubing connector 80 relative to one another upon being assembled. Such means also include lips 84*f* of the fitting 84 projecting from the elbow 84" and spaced from the plugs 84' such that a portion of the ends 70*a*, 70*b* is receivable therebetween. In other arrangements of the arcuate frame 52, the tubing members 70 and the tubing connectors 80 are arranged such that both translational and the rotational movements are hindered upon being assembled, for example by providing a friction fit or a snap fit therebetween. In yet other arrangements, alternative means for hindering movement between the tubing members 70 and the tubing connectors 80 are provided, some of which omit the interior cavity 70*c*, the plugs 84' and the lips 84*f*.

Figure 10:
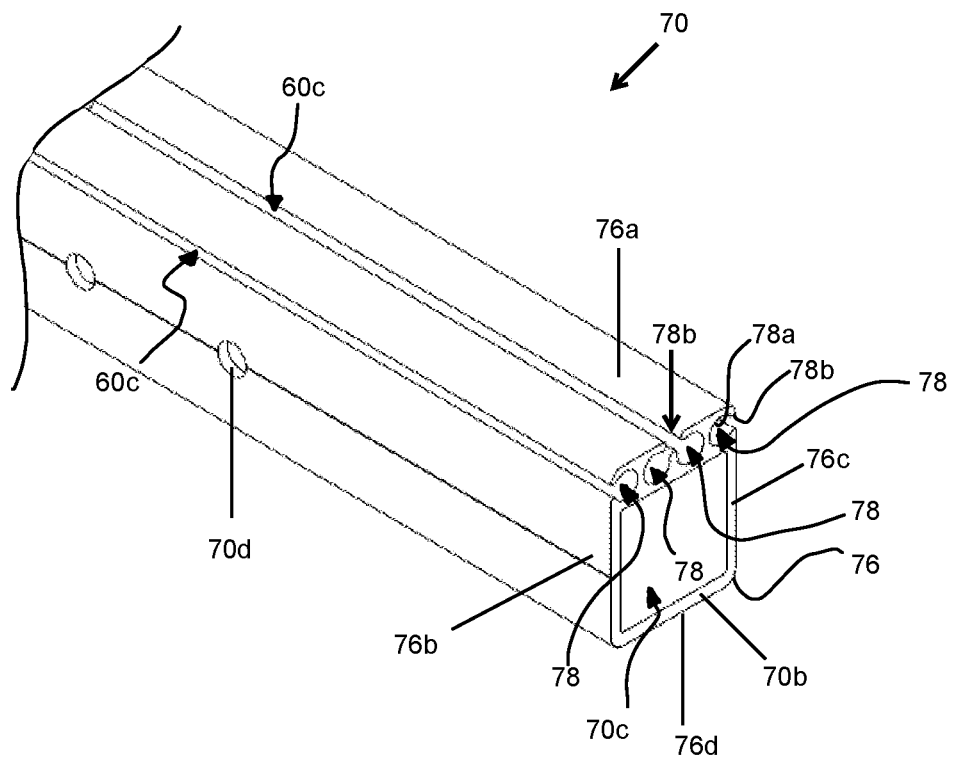
FIG. 10 is a perspective view of one of the tubing members of FIG. 9.

With reference to FIG. 10, the geometry of the tubing member 70 will be described in greater detail. The tubing member 70 has a periphery 76 having a generally rectangular shape. The periphery 76 includes an outer side 76*a* (i.e., a side configured for facing away from the cargo space 26), an inner side 76*d* (i.e., a side configured for facing toward the cargo space 26) opposite the outer side 76*a*, and lateral sides 76*b*, 76*c* disposed therebetween and facing away from one another. The sides 76*a*, 76*b*, 76*c*, 76*d* are generally planar, and edges of the periphery 76 at the junction of any two contiguous sides 76*a*, 76*b*, 76*c*, 76*d* are rounded-off. In other embodiments, the sides 76*a*, 76*b*, 76*c*, 76*d* define a shape that is not polygonal. In some such embodiments, at least one of the sides 76*a*, 76*b*, 76*c*, 76*d* has an arcuate shape. Also, the tubing member 70 has four tubing tracks 78 disposed lengthwise between its ends 70*a*, 70*b* and inward of its periphery 76. Each one of the tubing tracks 78 forms a segment of one of the tracks 60, i.e., is arranged such that cordons 44 of the tarp 40 are slidingly receivable thereby. In this arrangement of the tubing member 70 and the tubing tracks 78 are disposed inward of the outer side 76*a* and outward of the interior cavity 70*c*. As described with respect to the tracks 60, each tubing track 78 has a tubing channel 78*a* spaced inwardly from the periphery 76. Each tubing track 78 also has a tubing slot 78*b* in communication between outside of the periphery 76 and inside the corresponding tubing channel 78*a*. Two tubing tracks 78 are provided along the outer side 76*a* as well as one along each lateral side 76*b*, 76*c*. In this arrangement of tubing tracks 78, each tubing channel 78*a* extends along an axis that is parallel to a plane defined by the outer side 76*a* of the tubing member 70. Other arrangements of tubing members 70 are possible. For example, the tubing member 70 has at least one tubing track 78 along its outer side 76*a* and at least another one along one of its lateral sides 76*b*, 76*c*. In another example, the tubing member 70 is provided with an equal number of tubing tracks 78 as it is with tubing channels 78*a* and tubing slots 78*b*, i.e., each one of the tubing slots 78*b* is in communication with a sole tubing channel 78*a*. In another example, at least one of the tubing tracks 78 is along the inner side 76*d*.

Figure 11:
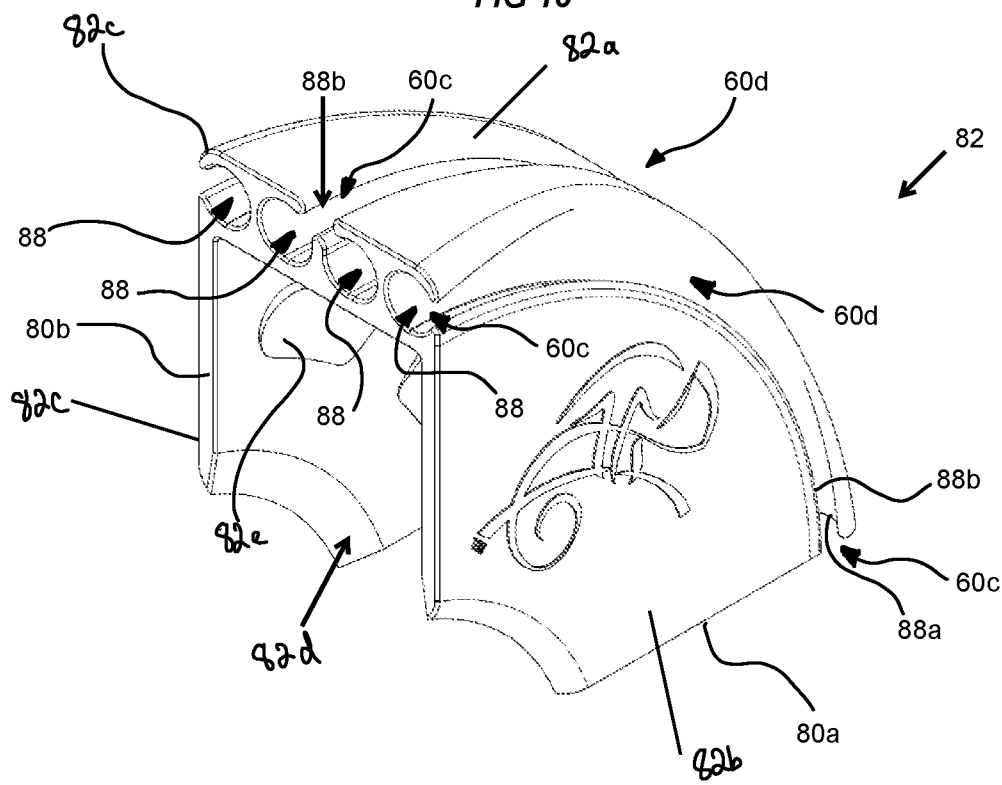
FIG. 11 is a perspective view of a cover of the tubing connector of FIG. 9.

Referring to FIG. 11, the geometry of the tubing connector 80 will be described in greater detail. The cover 82 defines the outer and lateral periphery sides 80*a*, 80*b*, 80*c* of the tubing connector 80, whereas the fitting 84 defines the inner periphery side 80*d* (see FIGS. 8 and 9). Each tubing connector 80 includes connector tracks 88 inward of the periphery 86 and extending between the ends 80'. In this arrangement of the tubing connector 80, the connector tracks 88 are defined inside the cover 82, namely inside the outer cover wall 82*a*. The connector tracks 88 follow one another and turn as they extend away from one of the ends 80' and toward the other, in this case completing a 90-degree turn. The outer periphery side 80*a* has a shape that follows the connector tracks 88 as they turn. The connector tracks 88 are arranged so as to be complementary to the tubing tracks 78 of the tubing members 70 such that upon the tubing connector 80 interfacing with the tubing members 70, the connector tracks 88 align with one of the tubing tracks 78 end to end. Each connector track 88 has a connector channel 88*a* spaced inwardly from the periphery 86 and a connector slot 88*b* in communication between outside of the periphery 86 and inside the corresponding connector channel 88*a*. Two connector tracks 88 are provided inside the outer cover wall 82*a* along the outer periphery side 80*a* as well as one inside each side cover wall 82*b*, 82*c*, along each lateral periphery side 80*b*, 80*c*. Other arrangements of tubing connectors 80 are possible. For example, in some such arrangements, the tubing connector 80 has at least one connector track 88 along its outer periphery side 80*a* and at least another one along one of its lateral periphery sides 80*b*, 80*c*. In another example, the tubing connector 80 is provided with an equal number of connector tracks 88 as it is with connector channels 88*a* and connector slots 88*b*, i.e., each one of the connector slots 88*b* is in communication with a sole connector channel 88*a*. In another example, at least one of the connector tracks 88 is along the inner periphery side 80*d*.

The tracks 60 of the arcuate frame 52 have retentive track portions 60*c* having a profile corresponding to the retentive profile described above, and also have non-retentive portions 60*d*. Such non-retentive portions 60*d* may be present in tubing track 78 and in connector track 88 alike. In this arrangement of the arcuate frame 52, the tubing tracks 78 are retentive throughout their lengths (i.e., do not have non-retentive portions 60*d*). The connector tracks 88 have retentive track portions 60*c* as well as non-retentive track portions 60*d*. The non-retentive track portions 60*d* are located about half way along the connector tracks 88 of the outer side 86*a* and extend toward either ends 80'. In other arrangements, some of the connector tracks 88 may have non-retentive track portions 60*d* of different lengths, or may otherwise be non-retentive throughout their lengths. In the non-retentive track portions 60*d*, the slot 60*c* is sized for allowing passage of the cordon 44 therethrough. In this arrangement of the connector tracks 88, a diameter of the connector channel 88*a* and a width of the connector slot 88*b* are respectively greater in the non-retentive track portion 60*d* than in the retentive track portion 60*c*. In this exemplary arrangement of the tubing connector 80, the connector tracks 88 have retentive track portions 60*c* at the ends 80', and flare as they extend from either ends 80' toward the non-retentive track portions 60*d* disposed therebetween. It can thus be appreciated that the non-retentive track portions 60*d* provide intermediary locations along the arcuate frame 52 at which the cordons 44 can be received by the tracks 60, or removed therefrom, in addition to those at the extremities 52*d*.

Figure 12A:
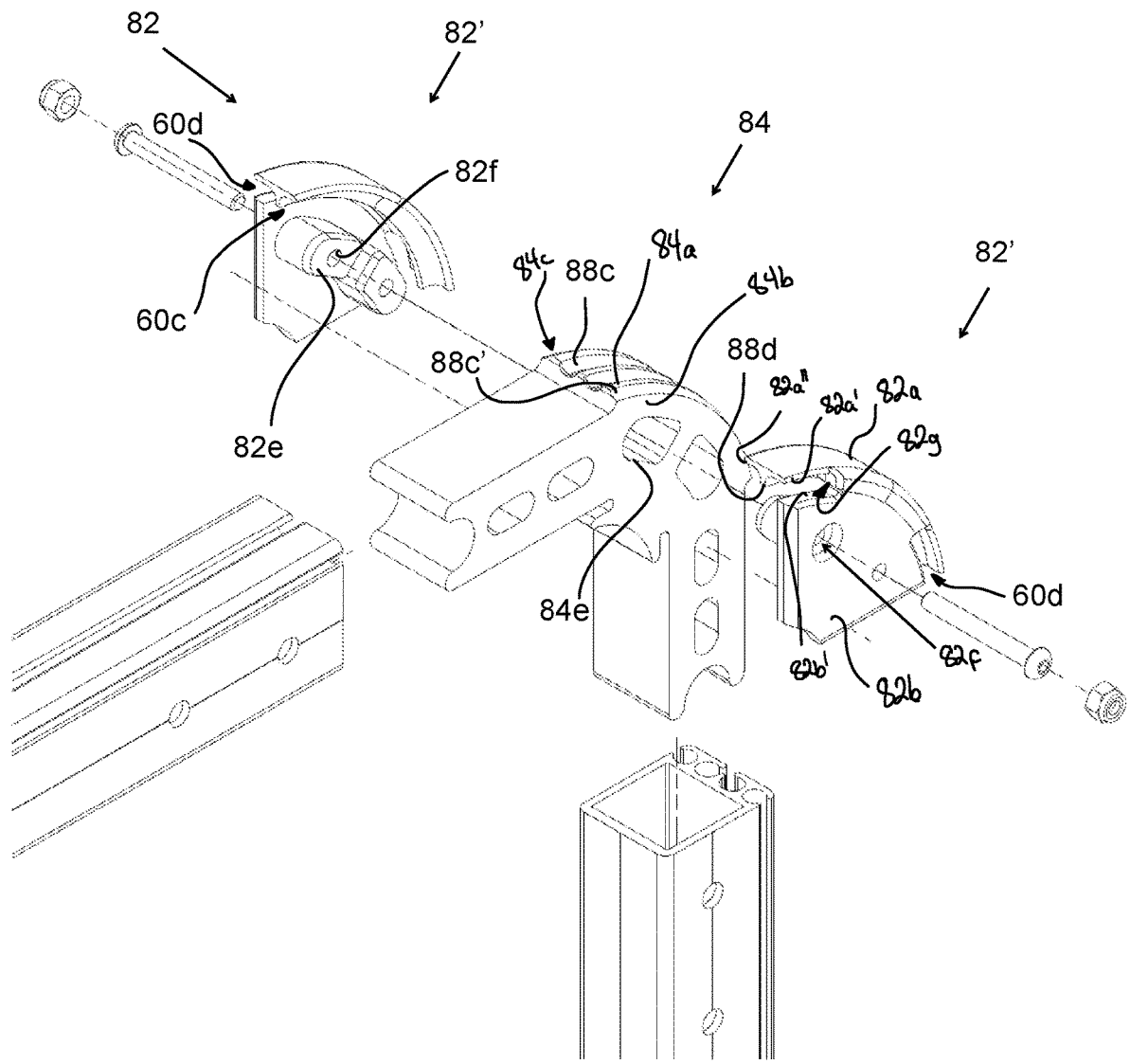
FIG. 12A is a perspective, exploded view of another tubing connector, shown disassembled from the tubing members of FIG. 9.

Another embodiment of the tubing connector 80 will now be described with reference to FIGS. 12A to 12D, in which features of the tubing connector 80 have the same reference numbers as similar features of the tubing connector 80 shown in FIGS. 9-11, and the description of such features shown in FIGS. 9-11 applies mutatis mutandis to the similar features shown in FIGS. 12A-12D. The tubing connector 80 has a cover 82 consisting of two pieces 82', also referred to as first and second covers 82', independently attachable to the fitting 84. The implementation shown may be described as a split arrangement, allowing to attach each piece 82' to the fitting 84 from either side thereof independently from one another. An exterior side and an interior side of the first piece 82' is shown in FIGS. 12B and 12C, and the second piece 82' is a mirror of the first piece 82'. Nevertheless, other configurations of the cover 82 in which each piece 82' exhibits distinctive features are possible. In this implementation, the fitting 84 has through openings 84*e*. Protrusions 82*e* of each piece 82' of the cover 82 are sized to substantially fill out a depth of their corresponding openings 84*e* upon being received therein, which may aid in providing a secure attachment of the cover 82 onto the fitting 84. The pieces 82' are provided with throughbores 82*f* extending laterally into the projections 82*e*, via which fasteners may be inserted to fasten the pieces 82' of the cover 82 to the fitting 84. In some implementations, one or more projections 82*e* may be shorter than the others, and throughbores 82*f* may be omitted from some projections 80*d*.

Complementary features of the cover 82 and the fitting 84 cooperate to define the connector tracks 88. Namely, the fitting 84 has grooves 88*c* defined in the outer fitting wall 84*a*. Each groove 88*c* forms a portion of one of the connector channels 88*a*. When the cover 82 is secured to the fitting 84, the outer cover walls 82*a* of each piece 82' are spaced apart from the outer fitting wall 84*a* to enclose the grooves 88*c* and further contribute to forming the connector channels 88*a*. The cover 82 has ridges 88*d* projecting inwardly (i.e., toward the inner periphery side 80*d*, or toward the outer fitting wall 84*a*) from the outer cover wall 82*a*, and extending lengthwise between the ends 80' of the tubing connector 80. Each ridge 88*d* of each piece 82' is disposed between an exterior lateral edge 82*a'* and laterally-spaced apart interior lateral edge 82*a"* of the outer cover wall 82 so as to extend between two adjacent grooves 88*c* when a corresponding side cover wall 82*b*, 82*c* (i.e., of a same cover piece 82') is attached to the fitting 84. In this implementation, each side of the ridge 88*c* contributes to forming one of the connector channels 88*a* with one of the fitting grooves 88*c*. A portion of the outer cover wall 82*a* overhanging a fitting groove 88*c* further contributes to forming one of the connector channels 88*a*, and terminates in one of the lateral edges 82*a'*,82*a"* the latter contributing to a corresponding connector slot 88*b*.

In this implementation, exterior fitting grooves 88*c'*, namely the fitting grooves 88*c* being closest to the side fitting walls 84*b*, 84*c*, are open toward the closest of the side fitting walls 84*b*, 84*c*, and also narrower than the interior fitting grooves 88*c* located between the exterior fitting grooves 88*c'*. By "narrower", it is understood that a width of the exterior fitting grooves 88*c'* is less than a width of the interior fitting grooves 88*c*, where the width is measured along a direction extending perpendicularly between the side fitting walls 84*b*, 84*c*. This configuration of the exterior fitting grooves 88*c'* may also be described as chamfers connecting the outer fitting wall 84*a* to the closest of the side fitting walls 84*a*, 84*c*. Along the exterior lateral edge 82*a'*, the side cover wall 82*b* is spaced inwardly relative to the exterior lateral edge 82*a'* so as to form the exterior connector slot 88*b*. The side cover wall 82*b* extends laterally toward the exterior fitting groove 88*c'* and past the exterior lateral edge 82*a'* to form the exterior connector channel 88*a* with the exterior fitting groove 88*c'*.

Figure 12D:
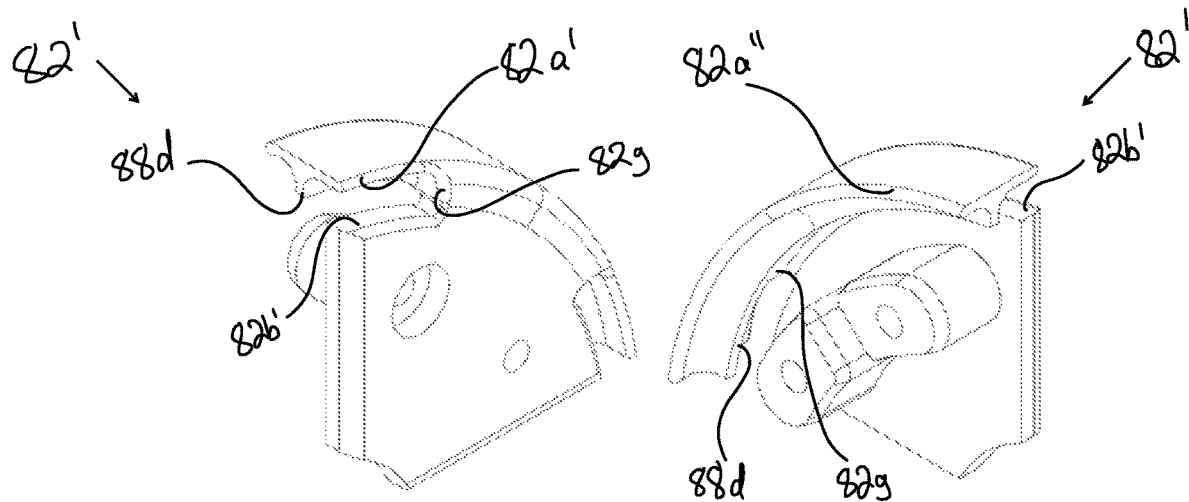
FIG. 12D is a perspective view of the tubing connector of FIG. 12A, shown assembled with the tubing members of FIG. 9.
Figure 12D:
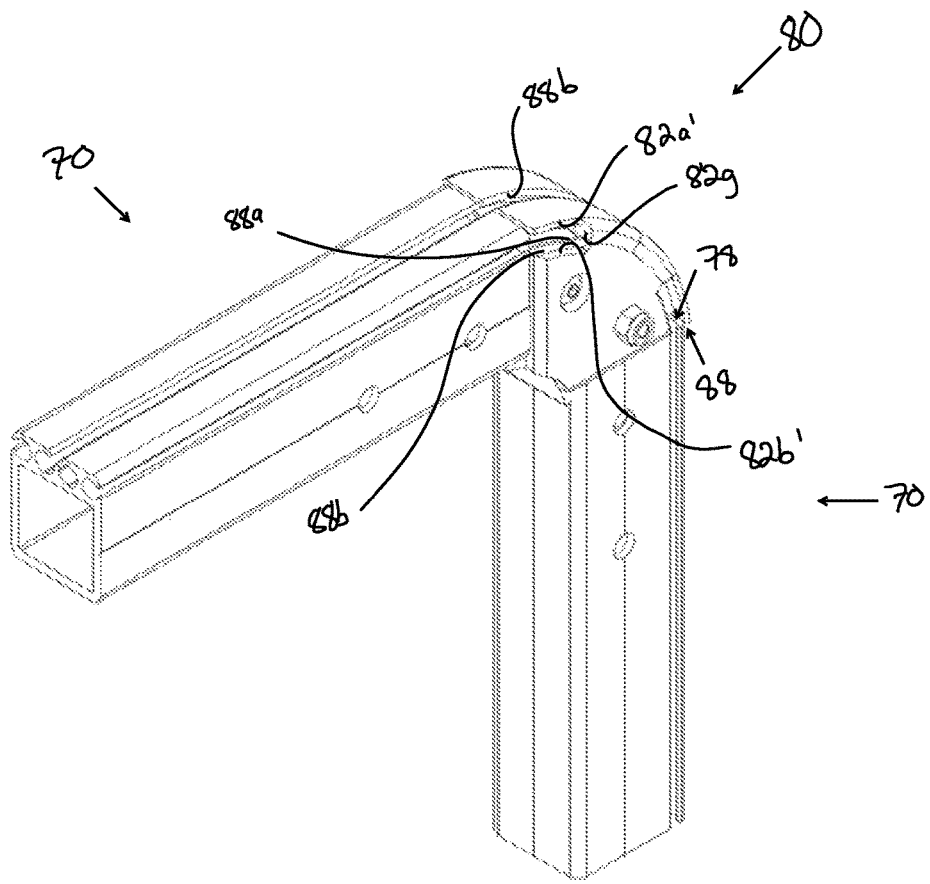

Moreover, in such split-type implementations of the cover 82, a junction between corresponding outer and side cover walls 82*a*, 82*b*, 82*c* may obstruct, or close, exterior connector tracks 88. As such, exterior connector slots 88*b* may be open at a first one of the connector ends 80' and closed at a location between the ends 80'. For example, the exterior lateral edge 82*a'* and the outer edge 82*b'* of a same exterior connector slot 88*b'* may be met, or joined, by a closing portion 82*g* of the cover piece 82'. In this exemplary configuration, the closing portion 82*g* extends between the exterior lateral edge 82*a'* and the outer edge 82*b'* to block off the exterior connector slot 88*b*. The closing portion 82*g* also extends laterally from the side cover wall 82*b*, 82*c* to the ridge 88 (FIG. 12C), extending across the exterior connector channel 88*a* (FIG. 12D) yet not fully blocking it. In other configurations, either one or both of the exterior connector channel 88a and slot 88b of a given exterior connector track 88 may be obstructed or closed by the closing edge 82g, whether in part or completely. In the present example, the track-defining features of the cover 82 and the fitting 84 are shaped such that the exterior connector tracks 88 form non-retentive portions 60d of their respective tracks 60, whereas the interior connector tracks 88 form retentive portions 60c. As best seen in FIG. 12D, the exterior connector tracks 88 are open wider than the exterior tubing tracks 78, such that cordons 44 may be slidably received by the exterior tubing tracks 78 via adjacent exterior connector tracks 88.

Figure 13:
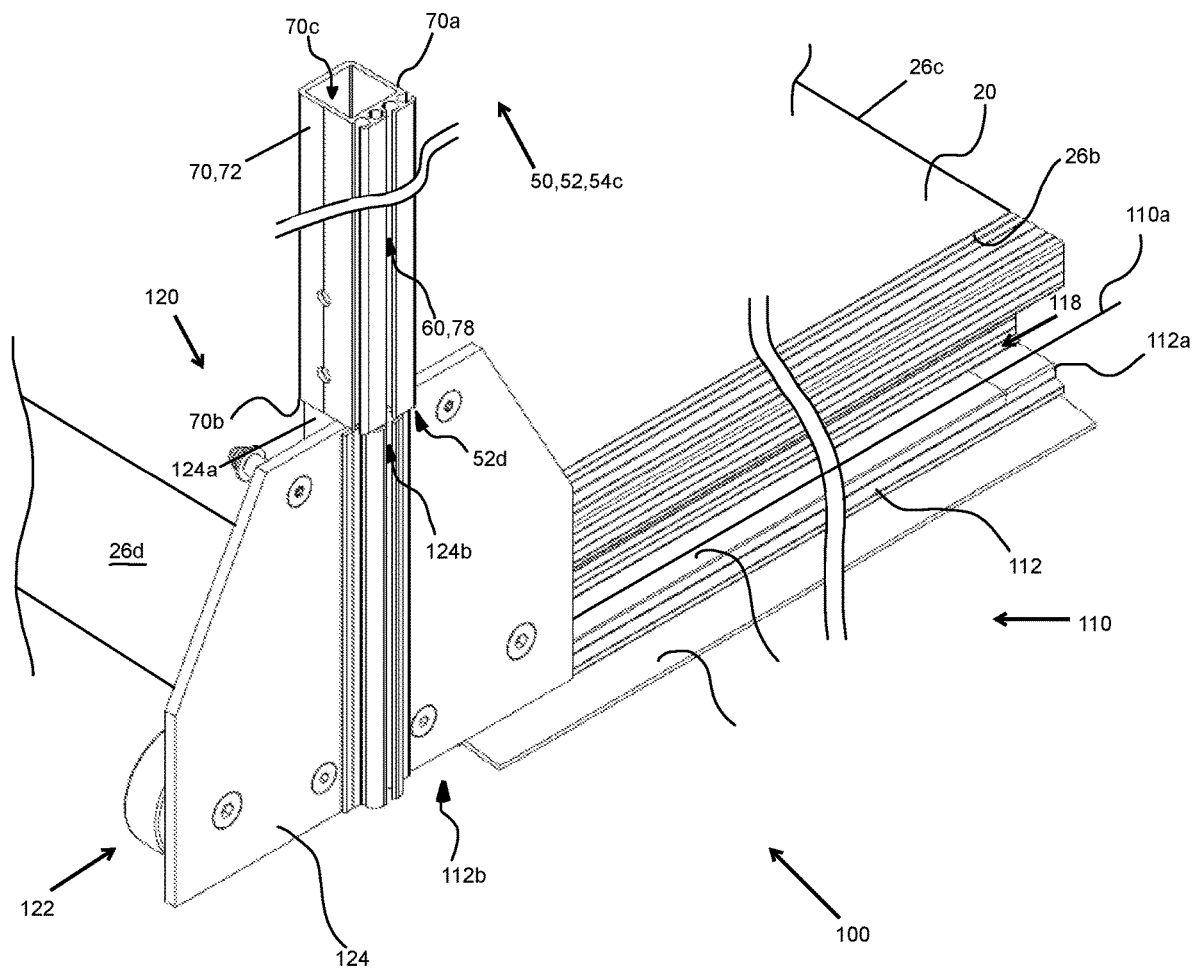
FIG. 13 is a perspective view of a rail system according to other aspects of the present disclosure, shown joined to the platform and tarp enclosure of FIG. 1.

Referring to FIG. 13, a rail system 100 is shown for mounting the tarp enclosure 30 the platform 20. The rail system 100 generally includes a rail assembly 110 and a carriage 120. The rail assembly 110 includes a rail body 112 that extends along a longitudinal rail axis 110a and is arranged to be joined to the platform 20, for example using fasteners, along either one of the left and right sides 22a, 22b of the platform 20. Upon the rail body 112 being joined to for example the right side 22b of the platform 20, the rail body 112 is oriented such that the rail and platform axes 112a, 20a are generally parallel. The rail body 112 has a C-shaped cross section and extends longitudinally along the rail axis 112 between its opposite ends 112a, 112b. The rail body 112 can be sized such that its ends 112a, 112b are placed proximate the front and rear sides 22a, 22b of the platform 20 upon being joined thereto. The carriage 120 is attachable to the tarp enclosure 30 via either one of the extremities 52d of the arcuate frame 52 or any one of its bows 50, for example the right-side extremity 52d of the arcuate frame of the rearmost intermediary bow 54c. The carriage 120 is slidably connected to the rail body 112. The carriage 120 is slidable with its corresponding bow 50 attached thereto relative to the rail assembly 110 along the rail axis 112a and between the ends 112a, 112b of the rail body 122. Thus, upon mounting the tarp enclosure 30 to the rail system 100, the tarp enclosure 30 is displaceable between the deployed and retracted positions relative to the platform 20 by sliding the carriages 120 with their respective corresponding bow 50, and vice-versa. It should be noted that the rail system 100 preferably includes a second rail system 100 joined to the opposite side 26a of the platform 20 and a plurality of carriages 120 slidably connected to the rail bodies 112 of either rail systems 100, a second carriage 120 of the second rail system 100 joined to the opposite (i.e., left-side) extremity 52d of the depicted arcuate frame 52.

Still referring to FIG. 13, the carriage 120 includes wheels 122 received by a channel 118 of the rail body 112 via which the carriage 120 is guided along the rail body 112. The carriage 120 also includes a support plate 124 to which the wheels 122 are rotatably connected. The support plate 124 is a flat structure having an outer side configured to face away from the rail body 112 and an opposite inner side connected to the wheels 122. The support plate 124 is attachable to the tarp enclosure 30. More specifically, the support plate 124 is arranged such that the arcuate frame 52 is fastenable thereto. In this arrangement of the carriage 120, its top end can interface the arcuate frame 52 so as to support it above the rail body 112. The support plate 124 includes a peg 124a disposed along its inner side and extending vertically to past its top end. The peg 124a is arranged to be receivable by the interior cavity 70c of the arcuate frame 52 at its extremity 52d. Also, the support plate 124 has plate tracks 124b disposed on its outer side in general alignment with the peg 124a and extending vertically from the top end of the support plate 124 toward its bottom end. Thus, upon attaching the arcuate frame 52 to the peg 124a, the tracks 60 are in contiguous alignment with the plate tracks 124b. As such, upon joining the rail system 100 to the platform 20, tarps 40 can be attached to the support plate 124 and to the arcuate frame 52 via their respective tracks 124b, 60 so as to extend from beneath the platform 20. Further, in some arrangements of the support plate 124, means for holding the tarp 40 in position relative to the bottom end of the support plate 124 can be provided, for instance with a bolt and/or cable.

Figure 18:
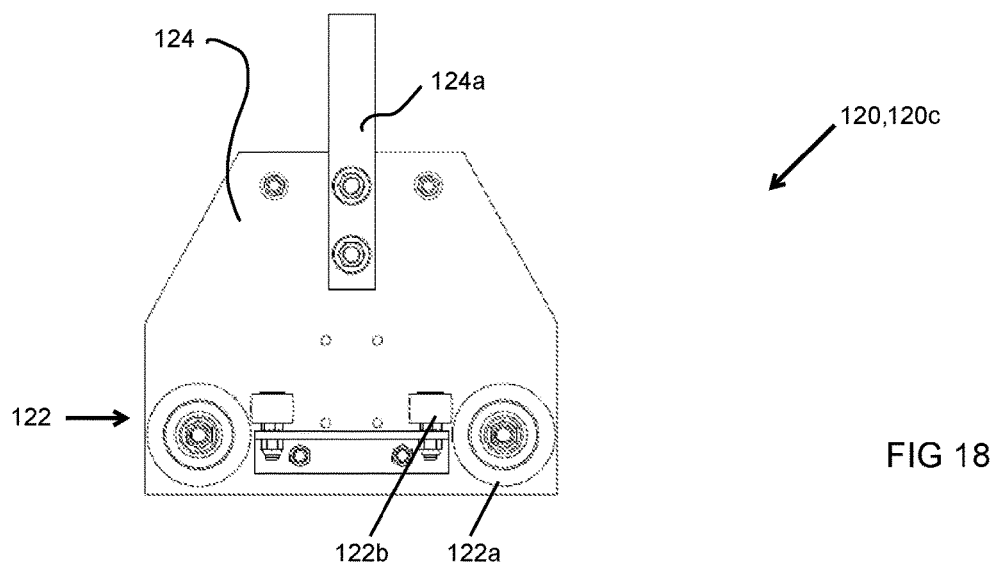
FIG. 18 is an elevation view of an inner side of an intermediary carriage of the rail system of FIG. 13.
Figure 19A:
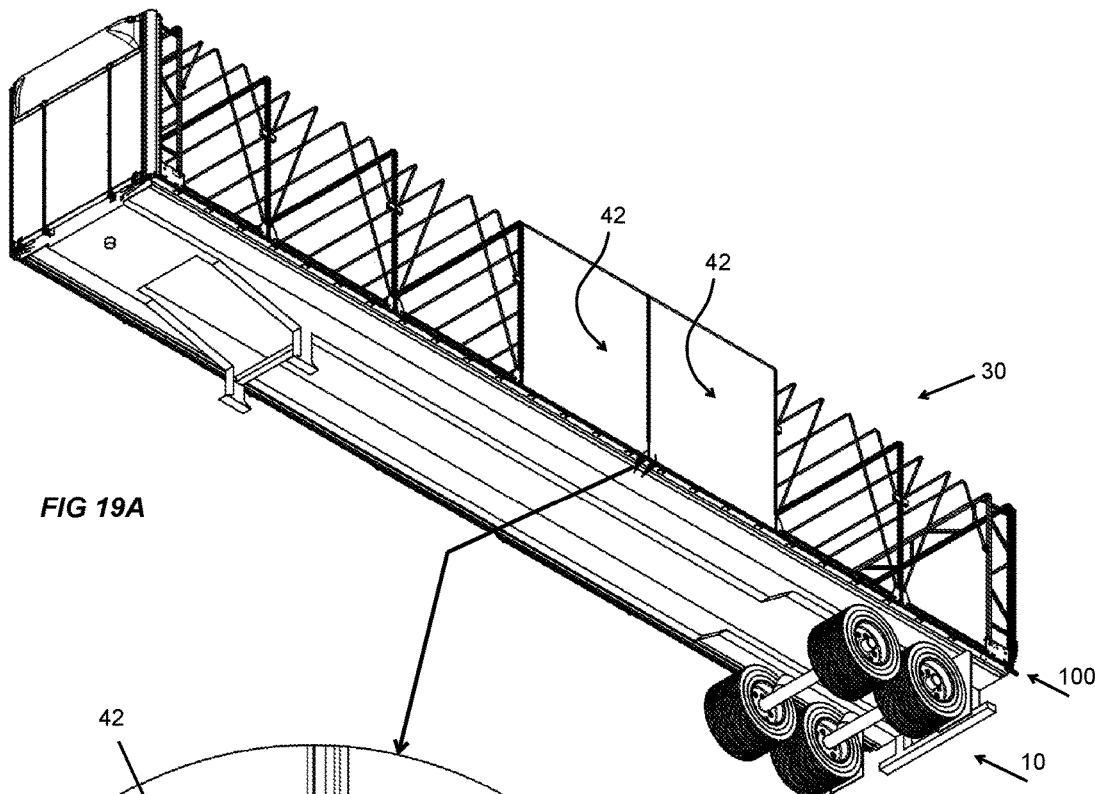
FIG. 19A is a perspective view of a trailer with a platform partially covered by a tarp.
Figure 19B:
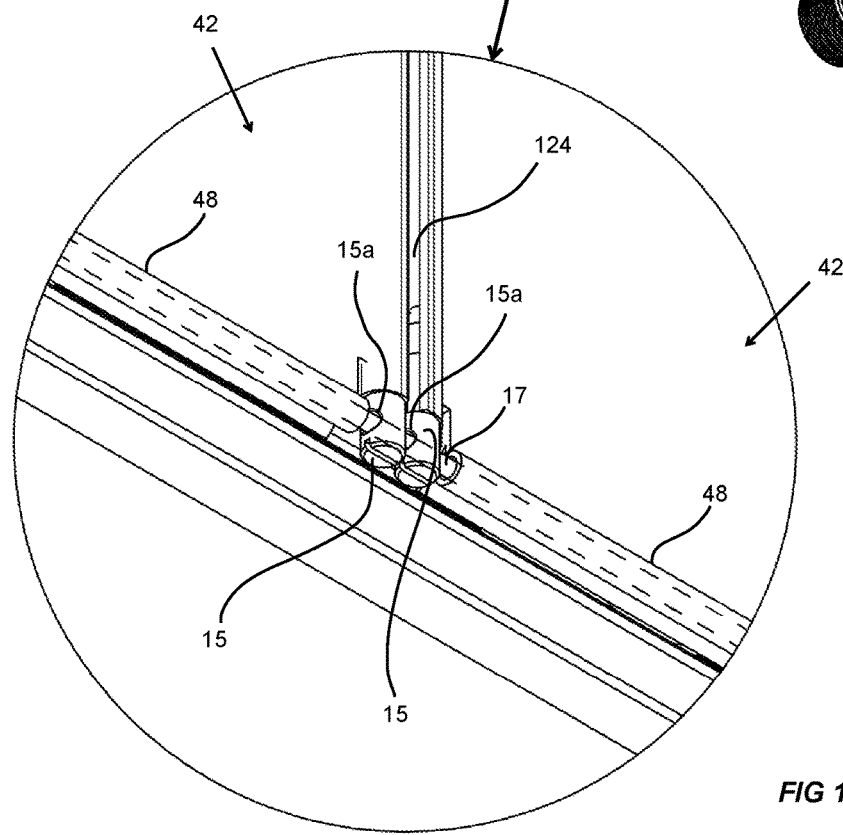
FIG. 19B is an enlarged view of the portion 19B-19B in FIG. 19A.

One possible configuration of retaining the tarp 40 in position at the bottom end of the support plate 124 is shown in FIGS. 19A and 19B. Tarp-retaining bolts 15 are secured to an outside of the support plate 124. A retaining element 17 is inserted through the sleeves 48 of the panels 42 which are disposed lengthwise along the left and right outer edges of the panels 42 of the tarp 40. The retaining element 17 may be a fabric loop, a polyethylene tube, a stainless steel cable, or any other suitable elongated body which can be inserted and slid through the sleeves 48 of the panels 42. The retaining element 17 is inserted through the tarp-retaining bolts 15, specifically through their through-holes 15A in FIGS. 18A and 18B, to secure the panels 42 to their corresponding support plates 124.

Figure 14:
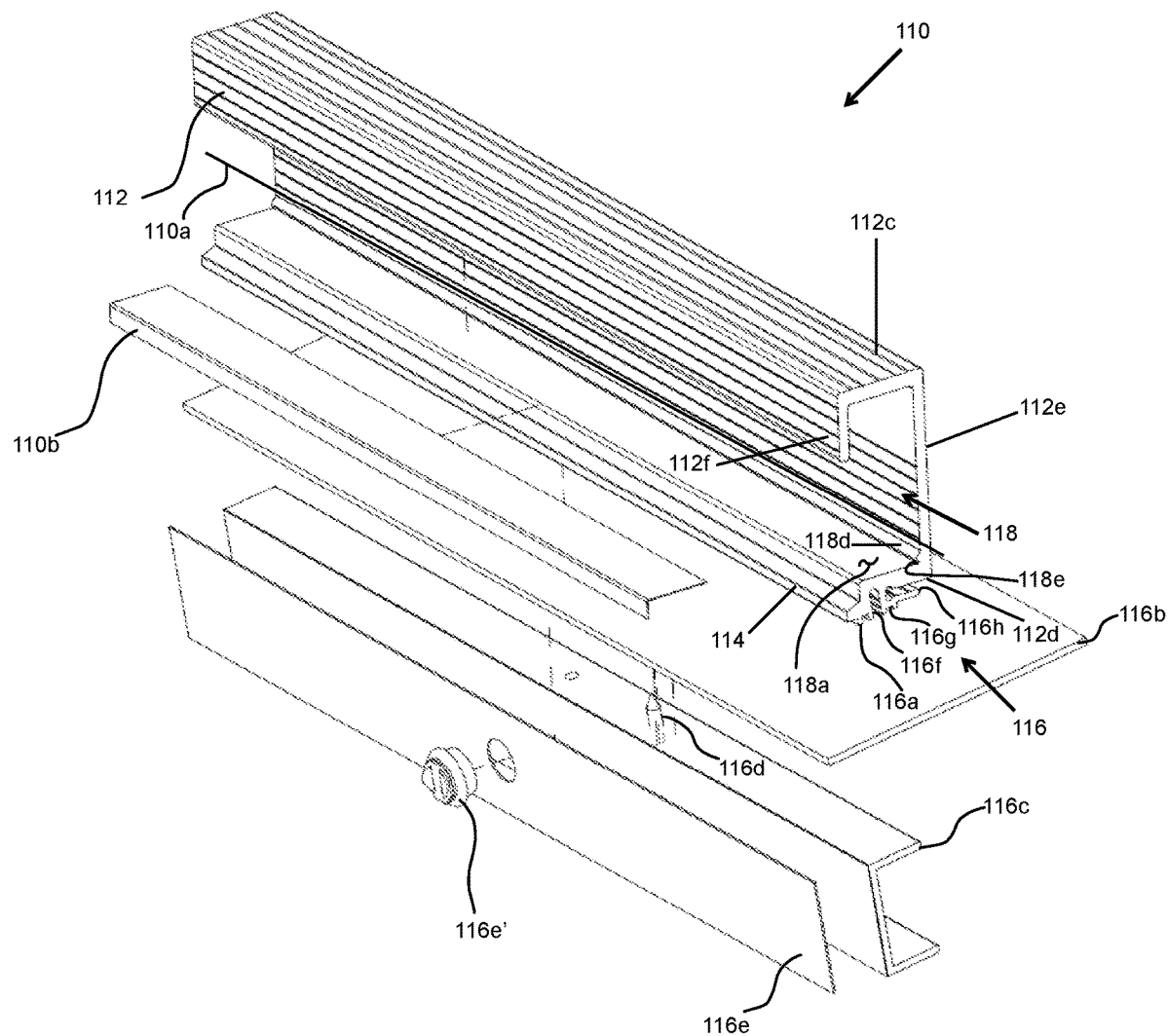
FIG. 14 is an exploded view of components of a rail assembly of the rail system of FIG. 13.

In FIG. 14, the rail assembly 110 is shown in more detail. The rail body 112 has a top rail wall 112c and a bottom rail wall 112d spaced beneath the top wall 112c. An inner rail wall 112e of the rail body 112 extends generally vertically between the top and bottom rail walls 112c, 112d. The inner rail wall 112e is shaped for interfacing with either one of the lateral sides 26a, 26b of the platform 20 to attach the rail body 112 thereto. The top, bottom and inner rail walls 112c, 112d, 112e together define the channel 118. The channel 118 extends alongside the inner rail wall 112e longitudinally between the ends 112a, 112b and vertically between the top and bottom rail walls 112c, 112d. An outer rail wall 112f of the rail body 112 is arranged so as to partially close the channel 118 opposite the inner rail wall 112e. The rail body 112 also includes a bumper 114 disposed beneath the channel 118 and joined to the bottom rail wall 112d. The bumper 114 extends laterally away from the inner rail wall 112e away from the channel 118. The bumper 114 is a structure projecting to the side of the channel 118 and arranged to shield a remainder of the rail body 112 from objects or debris originating from beside and beneath the rail body 112. For example, collisions with the rail body 112 may occur as cargo is being loaded onto the platform 20. Indeed, a fork lift or a pallet carried thereby may collide with the bumper 114 instead of wheel-bearing surfaces of the rail body 112 as it moves toward the cargo space 26. In this arrangement of the rail body 112, the bumper 114 is located fully beneath the bottom rail wall 112d, among other possible locations.

The rail body 112 also has mounting features 116 disposed proximate its bottom rail wall 112d and beneath the channel 118. The mounting features 116 can for example include a mudguard mounting surface 116a facing generally opposite the top rail wall 112c. A mudguard 116b can be disposed alongside the mudguard mounting surface 116a and held in place via a bar 116c disposed beneath the mudguard 116b and secured thereto via fasteners 116d. The bar 116c is a C-shaped bar, although other shapes of bars are possible, for example a flat bar or an L-shaped bar. The bar 116c can also be provided as a means for joining other elements to the platform, such as reflectors 116e or lights 116e'. The mudguard mounting surface 116a has a vertical slot 116f sized to receive the fasteners 116d, and ridges 116g shaped so as to impinge on the mudguard 116b as it is fastened. The bottom mounting features 116 also include other features such as a horizontal slot 116h. In this arrangement, the horizontal slot 116h is beneath the bottom rail wall 112d and extends toward the bumper 114. The horizontal slot 116h is arranged to join the rail body 112 to another bar (not shown) receivable by the horizontal slot 116h so as to extend therefrom to underneath the platform 20 and be fastened thereto. The bar may provide additional support for the mudguard 116b across its width. The width of the mudguard 116b can be sized such that it extends laterally to past either sides of the rail body 112, and at least from underneath the channel 118 to past the bumper 114. In some embodiments, at least one of the bumper 114 and the bottom mounting features 116 may form a component of the rail assembly 110 being detachable from the rail body 112. The rail assembly 110 also includes a protector plate 110b arranged to line at least a portion of the channel 118 so as to interface between the wheels 122 and the rail body 112. The protector plate 110b can assist in preventing wear of either the rail body 112 or the wheels 122. In embodiments, the protector plate 110b is constructed of a material having a friction coefficient greater than that of the rail body 112. The protector plate 110b can either be a unitary piece or be made of a plurality of segments. The protector plate 110b can extend along an entire length of the rail body 112 or along select portions thereof. In some embodiments, the protector plate 110b is omitted.

Figure 15:
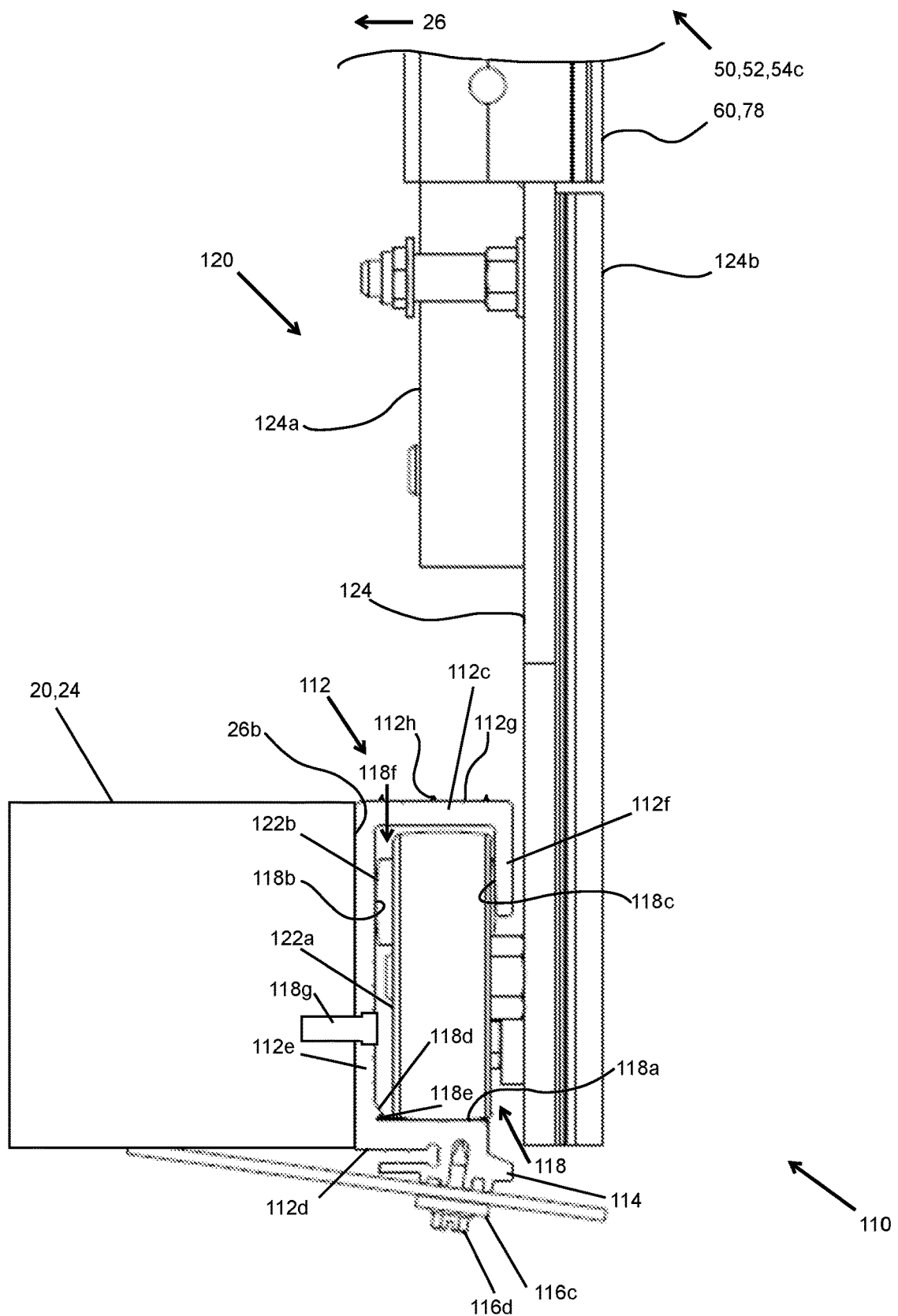
FIG. 15 is a rear elevation view of the rail system and platform of FIG. 13.

Referring to FIG. 15, a spatial relationship between the rail body 112 and the carriage 120 will be described in greater detail. The top rail wall 112c has a generally planar top outer surface 112g arranged to be generally flush with the platform 20 upon the rail body 112 being attached to either one of its lateral sides 26a, 26b, and can thus be said to form an extension of the platform 20. Anti-slip formations of the rail body 112, in this case ridges 112h projecting from the top outer surface 112g, extend alongside the top rail wall 112c. In this arrangement, the rail body 112 and the carriage 120 are sized and arranged such that the vertical tubing member 72 of the arcuate frame 52 is located above the rail body 112 and clear of the platform 20, effectively rendering the cargo space 26 fully available for storage. Moreover, the rail body 112 can be sized such that a vertical dimension thereof defined between the top and bottom rail walls 112c, 112d generally corresponds to a vertical dimension of the sides 26a, 26b of the platform 20. Stated otherwise, in some arrangements, the rail body 112 may be sized such that the inner rail wall 112e, and thus the channel 118, has a height that is equal or lesser than a that of the sides 26a, 26b of the platform 20. The channel 118 is sized to receive the wheels 122 of the carriage 120. An upper surface 118a of the bottom rail wall 112d forming a bottom boundary of the channel 118 interfaces with vertically-oriented wheels 122 of the carriage 120 (i.e., vertical wheels 122a) as it displaces relative to the rail body 112, and can thus be described as a wheel path. An outer surface 118b of the inner rail wall 112e and an inner surface 118c of the outer rail wall 112f respectively form inner and outer vertical boundaries of the channel 118 and interface with horizontally-oriented wheels 122 of the carriage 120 (i.e., horizontal wheels 122b). Inside the channel 118, a curb 118d (e.g., a bevel-like formation) of the rail body 112 is disposed at the junction of the bottom rail wall 112d and the inner rail wall 112e. A slot 118e is defined inward of the curb 118d. In this arrangement of the rail assembly 110, the slot 118e is arranged such that the protector plate 110b (see FIGS. 13, 14) is receivable thereby so as to be placed against the upper surface 118a of the bottom rail wall 112d.

Still referring to FIG. 15, the vertical and horizontal wheels 122a, 122b are arranged relative to one another to respectively interface with the bottom and inner rail walls 112d, 112e. Also, the horizontal wheels 122b space the vertical wheels 122a away from the inner rail wall 112e so as to form a clearance inside the channel 118, i.e., a gap 118f defined between the vertical wheels 122a and the outer surface 118b of the inner rail wall 112c. Per this arrangement between the wheels 122 and the rail body 112, the gap 118f can be used to receive other components of the rail assembly 110 such as, for example, a portion of a fastener 118g installed through the inner rail wall 112e to secure the rail body 112 to the platform 20. The rail body 112 and the fastener 118g can thus be arranged such that the fastener 118g is clear of the wheels 122, for example extending past the inner rail wall 112e to inside the gap 118f or countersunk into the inner rail wall 112e, upon being drawn into the platform 20 and against the rail body 112. In an embodiment, the fastener 118g is a flat socket whose head is flush with the outer surface 118b.

Figure 16:
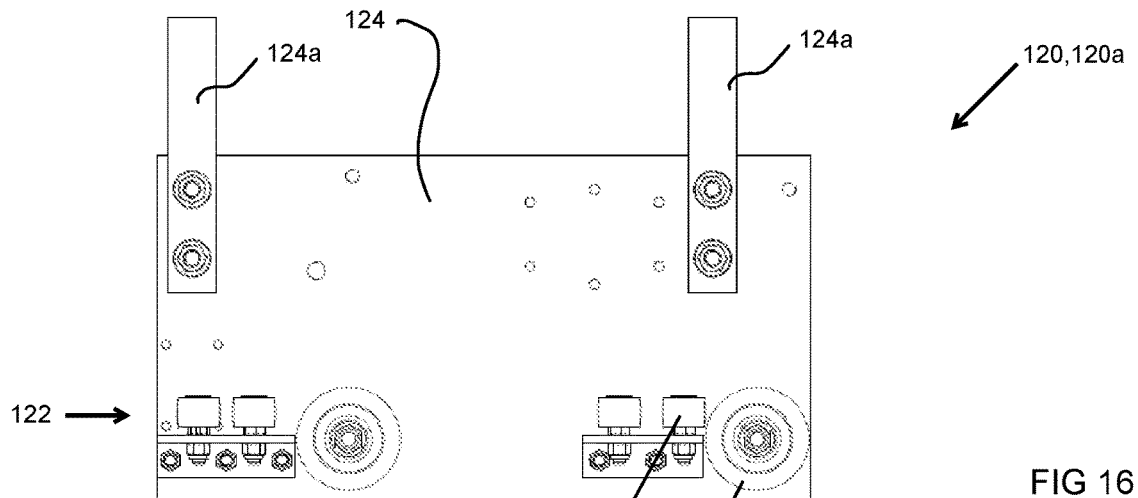
FIG. 16 is an elevation view of an inner side of a front carriage of the rail system of FIG. 13.
Figure 17:
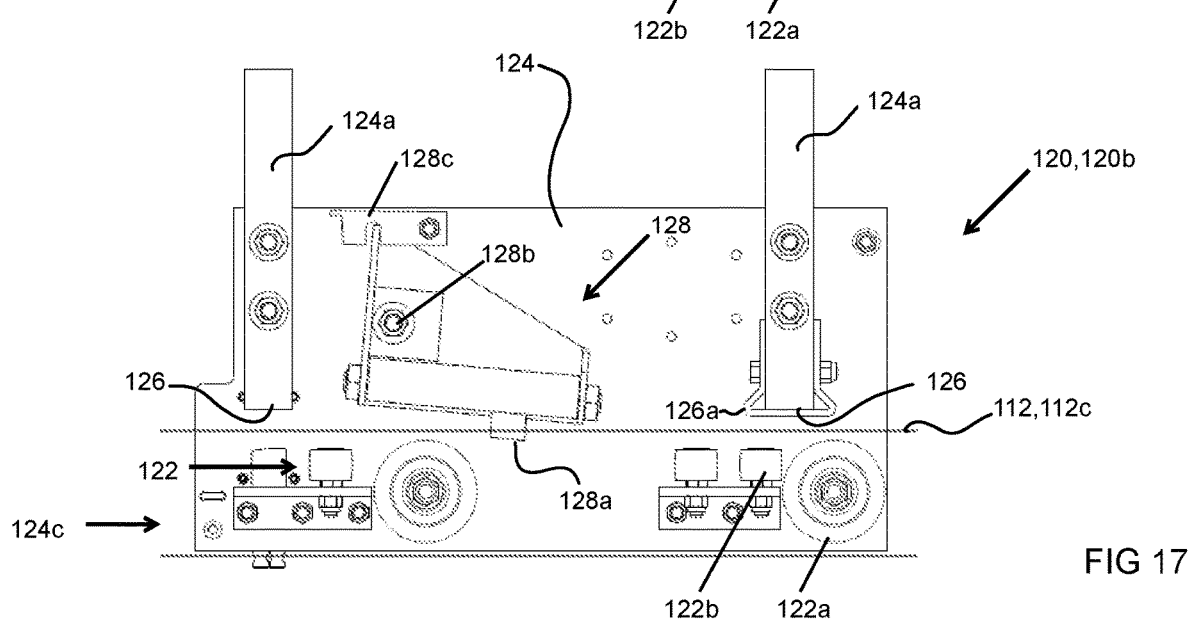
FIG. 17 is an elevation view taken of an inner side of a rear carriage of the rail system of FIG. 13.

Turning now to FIG. 16, the carriage 120 will be described in greater detail, as well as different arrangements thereof provided for supporting and displacing the foremost, intermediary and rearmost bows 54a, 54c, 54b. For instance, FIG. 16 shows a front carriage 120a arranged for supporting the foremost bow 54a. Front and rear sets of wheels 122 including vertical and horizontal wheels 122a, 122b are provided at front and rear ends of the interior side of the support plate 124. Further, front and rear pegs 124a are provided at the front and rear ends for respectively attaching the arcuate frame 52 and the reinforcement frame 54d of the foremost bow 54a. In FIG. 17, there is shown a rear carriage 120b arranged for supporting the rearmost bow 54b. The support plate 124 is provided with an abutment 126 for bridging a space between the tarp enclosure 30 and the rail body 112, in this case in the form of extensions to the pegs 124a. Such abutments 126 can abut the top wall 112c of the rail body 112 upon the bow 50 supported there above tilting either forwardly or rearwardly from the vertical so as to hinder further tilting of the bow 50. Such tilting may occur for example upon the bow 50 being tensioned by the tarp 40. The abutments 126 can be fitted with a shoe-like endpiece 126a, for example on the abutment 126 disposed on the side of the carriage 120 toward which the tarp 40 is to be tensioned, the endpiece 126a being arranged so as to increase the distribution of stress that may occur upon the abutment 126 interfacing the rail body 112. Also, the support plate 124 is provided with a stopping mechanism 128 having an engagement feature 128a configured to engage a complementary feature (not shown) of the rail body 112 so as to limit displacement of the rear carriage 120b and that of the bow 50 supported thereby within a certain range. The stopping mechanism 128 has a pivot 128b about which it is displaceable between an engaged position and a disengaged position, and a lock 128c arranged to selectively secure the stopping mechanism 128 in the engaged position. The stopping mechanism 128 may thus desirably assist in selectively discouraging undesired displacement of the tarp enclosure 30 following the release of a tensioning mechanism (not shown) thereof configured to selectively hold the rearmost bow 54b at the rear 22c of the platform 20 so as to hold the tarp enclosure 30 in a position near the deployed position. Such tensioning mechanism may for example hold the rearmost bow 54b via retainable features 124c provided at the rear of the support plate 124. In other arrangements of the tarp enclosure 30 and of the rail system 100, rear carriages 120b can be provided for supporting the rearmost bow 54*a*, and vice-versa. In FIG. 18, there is shown an intermediary carriage 120*c* arranged for supporting one of the intermediary bows 54*c*, as seen in FIG. 13. The support plate 124 is provided with a sole peg 124*a* for attaching the arcuate frame 52, as well as a set of wheels 122 on either side of the peg 124*a*.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A connector for a tubing system comprising:
    a fitting extending between opposite fitting ends and a peripheral fitting wall, a portion of the peripheral fitting wall being an outer fitting wall; and
    a cover extending between opposite connector ends and having a peripheral cover wall, the peripheral cover wall including an outer cover wall extending lengthwise away from a first connector end of the connector ends, the peripheral cover wall including a side cover wall adjacent to the outer cover wall, the cover removably attacheable to the fitting via the side cover wall, the outer cover wall overhanging the outer fitting wall and defining four connector tracks between the outer cover wall and the outer fitting wall upon the side cover wall being attached to the fitting, the four connector tracks extending between the connector ends and spaced laterally apart from each other.

2. The tubing connector of claim 1 wherein the fitting is a corner fitting, the opposite fitting ends being at a fitting angle to one another, and the cover is a corner cover, the opposite connector ends being at a cover angle to one another.

3. The tubing connector of claim 2, wherein the fitting angle and the cover angle are 90 degrees.

4. The tubing connector of claim 1, wherein the outer fitting wall defines a plurality of fitting grooves extending lengthwise between the fitting ends, the outer cover wall overhanging the outer fitting wall so as to partially enclose the fitting grooves to form at least one of the four connector tracks upon the side cover wall being attached to the fitting.

5. The tubing connector of claim 4, wherein the cover has at least one cover ridge disposed on the outer cover wall, the at least one cover ridge extending lengthwise away from the first cover end, the at least one cover ridge spaced laterally from the side cover wall and forming one of the connector tracks with one of the fitting grooves upon the side cover wall being attached to the fitting.

6. The tubing connector of claim 5, wherein the at least one cover ridge projects inwardly from the outer cover wall and toward the outer fitting wall upon the side cover wall being attached to the fitting.

7. The tubing connector of claim 6, wherein the at least one cover ridge extends between two adjacent fitting grooves of the plurality of fitting grooves upon the side cover wall being attached to the fitting.

8. The tubing connector of claim 7, wherein the plurality of fitting grooves includes exterior fitting grooves and one or more interior fitting grooves laterally disposed between the exterior fitting grooves, and the at least one cover ridge forming an inner track being one of the four connector tracks with at least one of the one or more interior fitting grooves upon the side cover wall being attached to the fitting.

9. The tubing connector of claim 4, wherein the plurality of fitting grooves includes exterior fitting grooves and one or more interior fitting grooves disposed between the exterior fitting grooves, and a lateral edge of the outer cover wall and an outer edge of the side cover wall delimit a connector slot defined in the peripheral cover wall, the cover slot and one of the exterior fitting grooves respectively forming portions of an exterior track of the four connector tracks upon the side cover wall being attached to the fitting.

10. The tubing connector of claim 9, wherein the connector slot extends longitudinally from the first connector end, the connector slot being open at the first connector end and closed at a location between the first and second connector ends.

11. The tubing connector of claim 10, wherein the peripheral cover wall defines a closing edge joining the lateral edge and the outer edge at the location between the first and second connector ends.

12. The tubing connector of claim 9, wherein the outer edge of the side cover wall extends laterally from one of the exterior fitting grooves upon the side cover wall being attached to the fitting.

13. The tubing connector of claim 12, wherein the exterior fitting grooves are narrower than the one or more interior fitting grooves.

14. The tubing connector of claim 1, wherein the peripheral fitting wall includes a side fitting wall adjacent the outer fitting wall and defines a cavity extending inwardly into the fitting from the side fitting wall, the cavity positioned beneath the outer fitting wall, the cover having a plug projecting laterally from the side cover wall, the plug sized to be received in the cavity.

15. The tubing connector of claim 1, wherein the cover is a first cover, the tubing connector including a second cover, the first and second covers attachable to the fitting via the side cover walls of the first and second covers such that the outer cover walls of the first and second covers overhang the outer fitting wall upon the side cover walls being attached to the fitting.

16. The tubing connector of claim 1, where the cover is a single-piece cover, the outer cover wall extending between two side cover walls, the outer cover wall having a first outer cover wall spaced apart from a second cover wall, the four connector tracks disposed in the cover between the first outer cover wall and the second outer cover wall.

17. The tubing connector of claim 16, wherein each one of the four connector tracks includes a connector channel and a connector slot in communication with the connector channel, the connector slot of at least one of the four connector tracks opening along the side cover wall.

18. The tubing connector of claim 16, wherein each one of the four connector tracks includes a connector channel and a connector slot in communication with the connector channel, two of the four connector tracks being external connector tracks having connector slots opening along the side cover walls, the other two of the four connector tracks being internal connector tracks sharing a common connector slot opening along the outer cover wall.

19. A tubing system for a tarp enclosure, the tubing system comprising:
    a tubing member extending lengthwise between opposite tubing ends, the tubing member having four tubing tracks extending along an outer tubing side thereof, the four tubing tracks sized to slidably receive an edge of a tarp of the tarp enclosure from either of the tubing ends;
    a tubing connector including:

a fitting extending between opposite fitting ends and a peripheral fitting wall, a portion of the peripheral fitting wall being an outer fitting wall; and a cover extending between opposite connector ends and having a peripheral cover wall, the peripheral cover wall including an outer cover wall extending lengthwise away from a first connector end of the connector ends, the peripheral cover wall including a side cover wall adjacent to the outer cover wall, the cover removably attacheable to the fitting via the side cover wall, the outer cover wall overhanging the outer fitting wall and defining four connector tracks between the outer cover wall and the outer fitting wall upon the side cover wall being attached to the fitting, the four connector tracks extending between the connector ends and spaced laterally apart from each other;

one of the fitting ends being engageable with one of the tubing ends to align each one of the four connector tracks with one of the four tubing tracks.

20. The tubing system of claim 19, wherein each one of the four tubing tracks includes a tubing channel and a tubing slot in communication between the tubing channel, the tubing slot of at least one of the four tubing tracks opening at a first side of the tubing member different than the outer tubing side.

21. The tubing system of claim 19, wherein the outer tubing side has a generally planar shape and each channel of the tubing tracks extends along a longitudinal axis of the tubing member laying in a plane parallel to the outer tubing side.

22. The tubing system of claim 19, wherein the tubing member defines an interior cavity extending therethrough along the longitudinal axis and inward of the outer tubing side, the four tubing tracks disposed between the outer tubing side and the interior cavity.

23. The tubing system of claim 19, wherein each one of the four tubing tracks forms a seal between the first tubing member and the tarp upon the edge of the tarp being received in the tubing track.

* * * * *